United States Patent
Wu et al.

(10) Patent No.: US 11,934,837 B2
(45) Date of Patent: Mar. 19, 2024

(54) SINGLE INSTRUCTION MULTIPLE DATA SIMD INSTRUCTION GENERATION AND PROCESSING METHOD AND RELATED DEVICE

(71) Applicant: HUAWEI TECHNOLOGIES CO., LTD., Guangdong (CN)

(72) Inventors: Chen Wu, Shanghai (CN); Yifan Lin, Shanghai (CN); Xiaoqiang Dan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/942,424

(22) Filed: Sep. 12, 2022

(65) Prior Publication Data
US 2023/0027224 A1  Jan. 26, 2023

Related U.S. Application Data

(63) Continuation of application No. PCT/CN2021/080342, filed on Mar. 12, 2021.

(30) Foreign Application Priority Data

Mar. 13, 2020 (CN) .......................... 202010177489.5

(51) Int. Cl.
*G06F 9/30* (2018.01)
*G06F 9/38* (2018.01)

(52) U.S. Cl.
CPC ........ *G06F 9/3887* (2013.01); *G06F 9/30065* (2013.01)

(58) Field of Classification Search
CPC .... G06F 9/3887; G06F 9/30065; G06F 8/452; G06F 9/3017
See application file for complete search history.

(56) References Cited

U.S. PATENT DOCUMENTS

| 5,640,528 A | 6/1997 | Harney et al. |
|---|---|---|
| 7,900,025 B2 | 3/2011 | Gschwind |

(Continued)

FOREIGN PATENT DOCUMENTS

| CN | 101799760 B | 4/2013 |
|---|---|---|
| CN | 103279327 A | 9/2013 |

(Continued)

OTHER PUBLICATIONS

Suo Weiyi, Research on DSP Automatic Vectorization and Optimization, PLA Information Engineering University, Apr. 15, 2013, with an English abstract total 87 pages.

(Continued)

*Primary Examiner* — Corey S Faherty
(74) *Attorney, Agent, or Firm* — WOMBLE BOND DICKINSON (US) LLP

(57) ABSTRACT

An SIMD instruction generation and processing method and a related device are provided. The method may include: obtaining a length of each loop dimension of a first tensor formula; selecting, from a plurality of groups of information about a first SIMD instruction model based on the length of each loop dimension of a first tensor formula, information about a second SIMD instruction model matching the first tensor formula; generating, based on a length of at least one loop dimension of the first tensor formula and the second SIMD instruction model, a first SIMD instruction obtained after the first tensor formula is converted. The information about a second SIMD instruction model is selected from the plurality of groups of information about a first SIMD instruction model based on the length of each loop dimension of the tensor formula.

16 Claims, 8 Drawing Sheets

(56) References Cited

U.S. PATENT DOCUMENTS

| | | | |
|---|---|---|---|
| 9,268,541 | B2* | 2/2016 | Bharadwaj ............ G06F 8/4441 |
| 11,556,757 | B1* | 1/2023 | Matveev ............... G06N 3/0495 |
| 11,650,817 | B2* | 5/2023 | Moudgill ............... G06F 9/3013 |
| | | | 712/5 |
| 2004/0064810 | A1 | 4/2004 | Wang et al. |
| 2006/0195828 | A1 | 8/2006 | Nishi et al. |
| 2008/0222623 | A1 | 9/2008 | Eichenberger et al. |
| 2017/0337060 | A1* | 11/2017 | Yamanaka ............... G06F 8/45 |
| 2018/0121786 | A1* | 5/2018 | Narayanaswami .... G06N 3/063 |
| 2018/0341479 | A1 | 11/2018 | Temam et al. |
| 2019/0318225 | A1* | 10/2019 | Heinecke ............ G06F 9/45516 |
| 2022/0365782 | A1* | 11/2022 | Wang .................... G06F 9/3001 |

FOREIGN PATENT DOCUMENTS

| | | |
|---|---|---|
| CN | 108009627 A | 5/2018 |
| CN | 109933369 A | 6/2019 |
| CN | 110263923 A | 9/2019 |

OTHER PUBLICATIONS

Jouppi, Norman P., et al. "In-datacenter performance analysis of a tensor processing unit." Proceedings of the 44th Annual International Symposium on Computer Architecture, Jun. 26, 2017, 17 pages.

Project Ne10, An Open Optimized Software Library Project for the ARM Architecture, https://github.com/projectNe10/Ne10, Jul. 28, 2015, 2 pages.

M. N. Bandyopadhyay, Introduction to Signals and Systems and Digital Signal Processing, PHI Learning, Dec. 2005, only the Abstract and with its English translation, 2 pages.

Deloitte, China Artificial Intelligence Industry White Paper, Academy of Information and Communications Technology (CAICT), Deloitte Research, Nov. 2018, with an English translation total 186 pages.

Frost and Sullivan, China Full Stack AI Market Research Report, http://legacy.frostchina.com/?p=15525, 2019, with an English translation total 187 pages.

Tsinghua, AI chip study report, Aminer Research Report Issue 14, Oct. 2018, with an English translation total 117 pages.

Kevin Stock et al, Model-Driven SIMD Code Generation for a Multi-Resolution Tensor Kernel, 2011 IEEE International Parallel and Distributed Processing Symposium, 10 pages, XP032052452.

Christopher Rodrigues et al, SIMDization of Small Tensor Multiplication Kernels for Wide SIMD Vector Processors, WPMVP 18, Feb. 24-28, 2018, Vienna, Austria 2018, 8 pages, XP058384632.

Simon Moll et al, Multi-dimensional Vectorization in Llvm, WPMVP 19, Feb. 16, 2019, Washington, DC, USA, 8 pages, XP093054509.

* cited by examiner

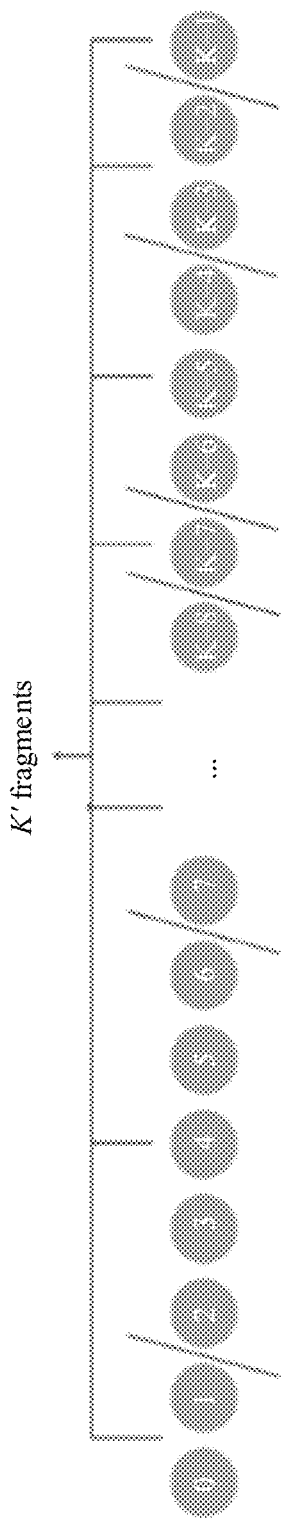

SINGLE INSTRUCTION MULTIPLE DATA SIMD INSTRUCTION GENERATION AND PROCESSING METHOD AND RELATED DEVICE

CROSS-REFERENCE TO RELATED APPLICATIONS

This application is a continuation of International Application No. PCT/CN2021/080342, filed on Mar. 12, 2021, which claims priority to Chinese Patent Application No. 202010177489.5 on Mar. 13, 2020. The disclosures of the aforementioned applications are hereby incorporated by reference in their entireties.

TECHNICAL FIELD

This application relates to the artificial intelligence field, and in particular, to a single instruction multiple data (SIMD) instruction generation and processing method and a related device.

BACKGROUND

Since the 1990s, various chip manufacturers start to integrate a single instruction multiple data (SIMD) instruction extension technology into a processor. An SIMD instruction has a significant acceleration effect when being used to process a problem with intensive computation, a simple control flow, and little data dependence, and is widely applied to a computer program for accelerating image processing, video processing, scientific computation, or the like.

Currently, a process of converting an input tensor formula into an SIMD instruction mainly relies on a brute-force search, and the brute-force search is to give a limited value range of each parameter in an SIMD instruction and enumerate all possible parameter combinations within the value ranges of all the parameter in the SIMD instruction. For each parameter combination, an SIMD instruction with the parameter combination needs to be converted into a corresponding tensor formula, whether an input tensor formula is equivalent to the tensor formula obtained after conversion is determined through comparison, and if the input tensor formula is equivalent to the tensor formula obtained after conversion, the SIMD instruction with the parameter combination is obtained; or if the input tensor formula is nonequivalent to the tensor formula obtained after conversion, the foregoing operations are performed for another parameter combination.

However, each parameter has large value space, and it needs to take a long period of time to obtain, through a brute-force search, an SIMD instruction matching an input tensor formula, causing low efficiency.

SUMMARY

Embodiments of this application provide an SIMD instruction generation and processing method and a related device, to select information about a second SIMD instruction model from a plurality of groups of information about a first SIMD instruction model based on a length of each loop dimension of a tensor formula, and further generate, based on the second SIMD instruction model, a first SIMD instruction obtained after the first tensor formula is converted, to greatly improve efficiency of an SIMD instruction generation process.

To resolve the foregoing technical problem, embodiments of this application provide the following technical solutions.

According to a first aspect, an embodiment of this application provides an SIMD instruction processing method. The method may be applied to an SIMD instruction generation field in a chip field. The method includes: An SIMD instruction generation apparatus obtains a length of each loop dimension of a first tensor formula. A tensor formula includes one for loop or nesting of a plurality of for loops. An operation formula that needs to be executed in each for loop is defined in the for loop. The operation formula includes a tensor and an operator. Certainly, each for loop may further include a value range of a coordinate in the tensor. The tensor is multilinear mapping defined in terms of a Cartesian product of vector space and dual space. The operator in the tensor formula determines an operation type of the tensor formula, and an operation type of the first tensor formula may be specifically addition or multiplication. The tensor formula may be specifically expressed in a form of a for loop, one tensor formula may include a plurality of data objects, and one loop dimension of the tensor formula is one for loop in the tensor formula. A length of one loop dimension in the tensor formula is an upper limit of a value of a coordinate in one for loop in the tensor formula, and one data object is one tensor in the tensor formula. The SIMD instruction generation apparatus obtains a plurality of groups of information about a first SIMD instruction model. Each group of information about a first SIMD instruction model corresponds to at least one loop dimension of one tensor formula, each group of information about a first SIMD instruction model includes a first constraint condition, and the first constraint condition is used to indicate a constraint condition of a length of each of the at least one loop dimension. The SIMD instruction generation apparatus selects information about a second SIMD instruction model from the plurality of groups of information about a first SIMD instruction model based on the first constraint condition and the length of each loop dimension of the first tensor formula. The information about a second instruction model matches the first tensor formula, and the length of the loop dimension of the first tensor formula meets the first constraint condition in the information about a second SIMD instruction model. The SIMD instruction generation apparatus generates a parameter value of the second SIMD instruction model based on a length of at least one loop dimension of the first tensor formula and the second SIMD instruction model, and substitutes the parameter value of the second SIMD instruction model into the second SIMD instruction model to generate the first SIMD instruction, so that the first SIMD instruction obtained after the first tensor formula is converted can be obtained. The second SIMD instruction model is used to generate the first SIMD instruction. A format of the first SIMD instruction model is the same as a format of the first SIMD instruction. A difference lies in that a parameter value of each parameter in the first SIMD instruction model is not determined, and a parameter value of each parameter in the SIMD instruction is determined. In this embodiment, a specific implementation solution of converting the first tensor formula into an SIMD instruction is implemented in the foregoing manner. The plurality of groups of information about a first SIMD instruction model are generated in advance, and a matched second SIMD instruction model is first selected from several groups of information about a first SIMD instruction model based on the length of each loop dimension of the tensor formula in a conversion process, to greatly improve efficiency of an SIMD instruction generation process.

In an embodiment, each group of information about a first SIMD instruction model further includes first indication information, one piece of first indication information is used to indicate a correspondence between K first parameters of one first SIMD instruction model and at least one loop dimension of one tensor formula, K is an integer greater than or equal to 1, and the first parameter indicates a quantity of times of repeatedly performing an operation on a data object in one tensor formula.

In an embodiment, the at least one loop dimension includes N loop dimensions, at least one group of information about a first SIMD instruction model includes a plurality of types of information about an SIMD instruction model, different types of information about an SIMD instruction model correspond to different values of N, and N is an integer greater than or equal to 1. In this embodiment, category division is performed on the at least one group of information about a first SIMD instruction model based on a quantity of loop dimensions that corresponds to the information about a first SIMD instruction model, to help separately manage different types of information about a first SIMD instruction model subsequently, so as to improve management precision.

In an embodiment, the first constraint condition is related to a chip type of the first SIMD instruction obtained after conversion, and different types of chips may correspond to different first constraint conditions. In this embodiment, a set of information about an SIMD instruction model is generated based on a specific chip, and different chips generate different information about an SIMD instruction model, so that not only an application scenario of this solution is extended, but also a degree at which an SIMD instruction model fits a chip is improved.

In an embodiment, that the SIMD instruction generation apparatus generates, based on the length of the at least one loop dimension of the first tensor formula and the second SIMD instruction model, the first SIMD instruction obtained after the first tensor formula is converted may include: The SIMD instruction generation apparatus generates a plurality of first SIMD instructions based on the length of the at least one loop dimension of the first tensor formula and the second SIMD instruction model. Specifically, the SIMD instruction generation apparatus may generate the parameter value of the second SIMD instruction model based on the length of each of the N loop dimensions of the first tensor formula, the second SIMD instruction model, and a coordinate linearization coefficient of the first tensor formula, and substitutes the parameter value of the second SIMD instruction model into the second SIMD instruction, to obtain the first SIMD instruction. The generated parameter value includes a parameter value of each first parameter in the second SIMD instruction model, a parameter value of a destination address stride, and a parameter value of a source address stride. The SIMD instruction generation apparatus selects, based on a cost function of each of the plurality of first SIMD instructions, an SIMD instruction that satisfies an optimization objective in the plurality of first SIMD instructions, and uses the selected SIMD instruction as the first SIMD instruction obtained after the first tensor formula is converted. The SIMD instruction that satisfies the optimization objective is an SIMD instruction whose cost function has a largest or smallest function value, and the cost function indicates an optimization objective related to the first SIMD instruction. In this embodiment, the cost function is generated in advance, to assist in selecting an optimal SIMD instruction when executing an SIMD instruction conversion stage of a tensor formula of a target operation type. The cost function is generated based on the optimization objective, and may meet an SIMD instruction optimization requirement of a user.

In an embodiment, the optimization objective indicated by the cost function includes at least one of the following: a smallest quantity of execution times of an SIMD instruction, a largest quantity of execution times of an SIMD instruction, a smallest quantity of bodies and tails in an SIMD instruction, a largest quantity of bodies and tails in an SIMD instruction, a longest interval between a body and a tail in an SIMD instruction, a shortest interval between a body and a tail in an SIMD instruction, a shortest scheduling delay of an SIMD instruction, a longest scheduling delay of an SIMD instruction, shortest total execution duration of an SIMD instruction, a highest calculation overhead of an address stride in an SIMD instruction, and a lowest calculation overhead of the address stride in an SIMD instruction. In this embodiment, a plurality of cases of the optimization objective are provided, and an application scenario of this solution is extended.

In an embodiment, an independent variable of the cost function includes at least one of the following: a parameter value of the first parameter in the first SIMD instruction, a quantity of bodies in the first SIMD instruction, a quantity of tails in the first SIMD instruction, a quantity of times of calculating an address stride in the first SIMD instruction, duration of executing one SIMD instruction, and duration of switching from a process of executing one first SIMD instruction to a process of executing another first SIMD instruction. Further, a parameter value of a first parameter in an SIMD instruction may include a parameter value of a first parameter in a body part of the SIMD instruction and a parameter value of a first parameter in a tail part of the SIMD instruction. In this embodiment, the SIMD instruction cost function considers both an SIMD instruction parameter and a hardware parameter of a chip, so that a generated optimal SIMD instruction can more fully use performance of the chip.

In an embodiment, that the SIMD instruction generation apparatus generates, based on the length of the at least one loop dimension of the first tensor formula and the second SIMD instruction model, the first SIMD instruction obtained after the first tensor formula is converted may include: The SIMD instruction generation apparatus obtains, based on the first indication information in the information about a second SIMD instruction model, a first parameter corresponding to a first loop dimension of the first tensor formula. The first loop dimension is one of the at least one loop dimension, and a length of the first loop dimension is not exactly divided by a value range of the corresponding first parameter. That the length of the first loop dimension is not exactly divided by the value range of the corresponding first parameter means that if one or more first parameters in the SIMD instruction are used to calculate one first loop dimension, the length of the first loop dimension is not exactly divided by one of the one or more first parameters or a product of a plurality of parameters in the one or more first parameters. For example, if the one or more first parameters include a fifth parameter and a sixth parameter, that the length of the first loop dimension is not exactly divided by the value range of the corresponding first parameter means that the length of the first loop dimension is not exactly divided by a value range of the fifth parameter, or the length of the first loop dimension is not exactly divided by a value product of the fifth parameter and the sixth parameter. The SIMD instruction generation apparatus generates a parameter value of a body part of the first SIMD instruction and a parameter value of a tail part of the first SIMD instruction based on the length of the first loop dimension. For meanings of the body and the tail, the body is a part that is of an SIMD instruction and whose amount of data is equal to a preset amount, and the tail is a part that is of the SIMD instruction and whose amount of data is less than the preset amount. When the chip performs batch calculation on data by invoking the SIMD instruction, a fixed amount of data can be processed in each batch. If an amount of to-be-processed data cannot be exactly divided by the fixed amount, the tail is set, an amount of data existing in the tail is less than the fixed amount, and an amount of data existing in the body is equal to the fixed amount; or if an amount of to-be-processed data may be exactly divided by the fixed amount, no tail exists. In this embodiment, a problem that the length of the first loop dimension is not exactly divided by the value range of the corresponding first parameter can be resolved by using a body and tail technology, to extend an application scenario of this solution, and extend an applicable scope of this solution.

In an embodiment, that the SIMD instruction generation apparatus generates, based on the length of the at least one loop dimension of the first tensor formula and the second SIMD instruction model, the first SIMD instruction obtained after the first tensor formula is converted may include: The SIMD instruction generation apparatus obtains, based on the first indication information in the information about a second SIMD instruction model, a first parameter corresponding to a second loop dimension of the first tensor formula, where the second loop dimension is a highest loop dimension in the at least one loop dimension, and a length of the second loop dimension exceeds an upper limit of a value of the corresponding first parameter; and the SIMD instruction generation apparatus generates a parameter value of a body part of the first SIMD instruction based on the length of the second loop dimension. In this embodiment, a value range of a length of a loop dimension in a constraint condition may be extended by using the body and tail technology, to extend an applicable scope of this solution.

In an embodiment, the at least one group of information about a first SIMD instruction model includes information about a third SIMD instruction model, information about a fourth SIMD instruction model, and information about a fifth SIMD instruction model, a value of N corresponding to the information about a third SIMD instruction model is less than a value of N corresponding to the information about a fourth SIMD instruction model, the value of N corresponding to the information about a fourth SIMD instruction model is less than a value of N corresponding to the information about a fifth SIMD instruction model, and N corresponding to the information about a fourth SIMD instruction model is greater than or equal to 2. That the SIMD instruction generation apparatus selects information about at least one group of information about a second SIMD instruction model from the at least one group of information about a first SIMD instruction model includes: The SIMD instruction generation apparatus selects the information about a second SIMD instruction model from the information about a third SIMD instruction model; and if the information about a second SIMD instruction model does not exist in the information about a fourth SIMD instruction model, terminating selecting the information about a second SIMD instruction model from the information about a fifth SIMD instruction model. Further, the SIMD instruction generation apparatus selects the information about a second SIMD instruction model from the information about a third SIMD instruction model, and then selects the information about a second SIMD instruction model from the information about a fourth SIMD instruction model. In this embodiment, if a matched model does not exist in a low dimensional model, matching does not need to be performed on a high dimensional model, to effectively reduce a quantity of matching times, and further improve SIMD instruction generation efficiency.

In an embodiment, the method further includes: The SIMD instruction generation apparatus obtains a second constraint condition. The second constraint condition is used to indicate a quantity of destination addresses in the first SIMD instruction model and a quantity of source addresses in the first SIMD instruction model. The SIMD instruction generation apparatus obtains a quantity of destination addresses in the first tensor formula and a quantity of source addresses in the first tensor formula. That the SIMD instruction generation apparatus selects information about at least one group of information about a second SIMD instruction model from the at least one group of information about a first SIMD instruction model includes: The SIMD instruction generation apparatus selects the at least one group of information about a second SIMD instruction model from the at least one group of information about a first SIMD instruction model when the quantity of destination addresses in the first tensor formula is the same as the quantity of destination addresses in the first SIMD instruction model, and the quantity of source addresses in the first tensor formula is the same as the quantity of source addresses in the first SIMD instruction model. The method further includes: outputting alarm information when the quantity of destination addresses in the first tensor formula is different from the quantity of destination addresses in the first SIMD instruction model, or the quantity of source addresses in the first tensor formula is different from the quantity of source addresses in the first SIMD instruction model. In this embodiment, in a process of performing an automatic SIMD instruction conversion operation, whether the quantity of destination addresses and the quantity of source addresses in the first tensor formula meet a requirement for a quantity of destination addresses and a quantity of source addresses in an SIMD instruction model is first determined. Only when a constraint is satisfied, a subsequent SIMD instruction model matching operation is performed, to improve efficiency of an automatic SIMD instruction conversion process. In addition, if the requirement is not met, the alarm information is output in a timely manner, to remind a technical person to intervene in a timely manner.

In an embodiment, that the SIMD instruction generation apparatus obtains at least one group of information about a first SIMD instruction model includes: The SIMD instruction generation apparatus obtains the at least one group of information about a first SIMD instruction model from a set of information about an SIMD instruction model. The set of information about an SIMD instruction model includes at least one subset of information about an SIMD instruction model, each subset of information about an SIMD instruction model corresponds to a tensor formula of one operation type, different subsets of information about an SIMD instruction model correspond to tensor formulas of different operation types, and a subset that is of information about an SIMD instruction model and to which the at least one group of information about a first SIMD instruction model belongs corresponds to an operation type of the first tensor formula. In this embodiment, the information about a first SIMD instruction model is generated for a tensor formula of a specific operation type. In other words, tensor formulas of different operation types correspond to different information about an SIMD instruction model. Therefore, there is a higher degree at which the information about a first SIMD instruction model fits a tensor formula of the operation type of the first tensor formula, and efficiency of an SIMD instruction generation process is improved.

In an embodiment, the method includes: The SIMD instruction generation apparatus obtains a first parameter value and a second parameter value that correspond to a first SIMD instruction model. The first parameter value is K and is used to indicate that the first SIMD instruction model includes K first parameters, K is an integer greater than or equal to 1, the second parameter value indicates a value constraint of the K first parameters, and the first parameter reflects a quantity of times of repeatedly performing an operation on a data object in a tensor formula matching the first SIMD instruction model. The SIMD instruction generation apparatus generates information about a first SIMD instruction model based on the first parameter value and the second parameter value. Specifically, an SIMD instruction processing apparatus generates, based on the first parameter, the first indication information included in the information about a first SIMD instruction model; and generates, based on the first indication information and a second parameter, the first constraint condition included in the information about a first SIMD instruction model. In this embodiment, a generated set that is of information about an SIMD instruction model and that corresponds to the chip is used to indicate to perform an SIMD instruction conversion operation on a tensor formula. In addition, the plurality of groups of information about a first SIMD instruction model are generated in advance, and a matched combination is first selected from several combinations based on lengths of N loop dimensions of the tensor formula in a conversion process, to greatly reduce difficulty in an SIMD instruction generation process, and improve automatic SIMD instruction generation efficiency.

In an embodiment, the method further includes: The SIMD instruction generation apparatus obtains a third parameter value. The third parameter value indicates a constraint on a quantity of bodies in the first SIMD instruction model. That the SIMD instruction generation apparatus generates information about a first SIMD instruction model based on the first parameter value and the second parameter value includes: generating the first indication information based on the first parameter value; and generating the first constraint condition based on the first indication information, the second parameter value, and the third parameter value. The first constraint condition includes a constraint condition of the length of the second loop dimension of the first SIMD instruction model, and an upper limit of a value of the length of the second loop dimension may be extended by setting a body. Further, a body is set to extend the upper limit of the value of the length of the second loop dimension in a multiplexed manner. In this embodiment, a constraint on a quantity of bodies in an SIMD instruction of a target type in the chip is obtained in advance, and a constraint condition used to indicate a length of a loop dimension of a tensor calculation type is generated with reference to the constraint on the quantity of bodies. A value range of the length of the loop dimension in the constraint condition may be enlarged by using the body and tail technology, to extend an applicable scope of this solution.

In an embodiment, the method further includes: The SIMD instruction generation apparatus obtains a fourth parameter value. The fourth parameter value is used to indicate a quantity of destination addresses in the first SIMD instruction model and a quantity of source addresses in the first SIMD instruction model. The SIMD instruction generation apparatus generates a second constraint condition based on the fourth parameter value. The second constraint condition is used to indicate a quantity of destination addresses and a quantity of source addresses in the tensor formula matching the first SIMD instruction model. In this embodiment, a quantity of destination addresses and a quantity of source addresses in the SIMD instruction of the target type in the chip are obtained in advance, and the second constraint condition is generated. The second constraint condition is used to indicate a quantity of destination addresses and a quantity of source addresses in the tensor formula of the target operation type. Therefore, whether an SIMD instruction model matches a to-be-converted tensor formula can be preliminarily determined based on the second constraint condition, to avoid a waste of computer resources, and help improve efficiency of a tensor formula conversion stage.

In an embodiment, the method further includes: The SIMD instruction generation apparatus obtains a cost function corresponding to the first SIMD instruction model. The cost function is used to select an optimal SIMD instruction when the SIMD instruction generation apparatus performs an SIMD instruction conversion operation on the tensor formula of the target operation type.

According to a second aspect, an embodiment of this application provides an SIMD instruction processing method. The method may be applied to an SIMD instruction generation field in a chip field. The method may include: An SIMD instruction processing apparatus obtains a first parameter value and a second parameter value that correspond to a first SIMD instruction model. The first parameter value is K and is used to indicate that the first SIMD instruction model includes K first parameters, K is an integer greater than or equal to 1, the second parameter value indicates a value constraint of the K first parameters, and the first parameter reflects a quantity of times of repeatedly performing an operation on a data object in a tensor formula matching the first SIMD instruction model. The SIMD instruction processing apparatus generates information about a first SIMD instruction model based on the first parameter value and the second parameter value. One piece of information about a first SIMD instruction model corresponds to one first SIMD instruction model, the information about a first SIMD instruction model includes first indication information and a first constraint condition, the first indication information is used to indicate a correspondence between the K first parameters and at least one loop dimension of the tensor formula matching the first SIMD instruction model, and the first constraint condition is used to indicate a constraint condition of a length of each of the at least one loop dimension.

In an embodiment, the method further includes: The SIMD instruction processing apparatus obtains a third parameter value. The third parameter value indicates a constraint on a quantity of bodies in the first SIMD instruction model. That the SIMD instruction processing apparatus generates information about a first SIMD instruction model based on the first parameter value and the second parameter value includes: generating the first indication information based on the first parameter value; and generating the first constraint condition based on the first indication information, the second parameter value, and the third parameter value.

In an embodiment, the method further includes: The SIMD instruction processing apparatus obtains a fourth parameter value, where the fourth parameter value is used to indicate a quantity of destination addresses in the first SIMD instruction model and a quantity of source addresses in the first SIMD instruction model; and generates a second constraint condition based on the fourth parameter value, where the second constraint condition is used to indicate a quantity of destination addresses and a quantity of source addresses in the tensor formula matching the first SIMD instruction model.

In an embodiment, the method further includes: The SIMD instruction processing apparatus obtains a cost function corresponding to the first SIMD instruction model. The cost function is used to select an SIMD instruction that satisfies an optimization objective, the SIMD instruction that satisfies the optimization objective is an SIMD instruction whose cost function has a largest or smallest function value, and an independent variable of the cost function includes at least one of the following: a parameter value of the first parameter in the first SIMD instruction, a quantity of bodies in the first SIMD instruction, a quantity of tails in the first SIMD instruction, a quantity of times of calculating an address stride in the first SIMD instruction, duration of executing one SIMD instruction, and duration of switching from a process of executing one first SIMD instruction to a process of executing another first SIMD instruction.

In an embodiment, an optimization objective of the cost function includes at least one of the following: a smallest quantity of execution times of an SIMD instruction, a largest quantity of execution times of an SIMD instruction, a smallest quantity of bodies and tails in an SIMD instruction, a largest quantity of bodies and tails in an SIMD instruction, a longest interval between a body and a tail in an SIMD instruction, a shortest interval between a body and a tail in an SIMD instruction, a shortest scheduling delay of an SIMD instruction, a longest scheduling delay of an SIMD instruction, shortest total execution duration of an SIMD instruction, a highest calculation overhead of an address stride in an SIMD instruction, and a lowest calculation overhead of the address stride in an SIMD instruction.

In the second aspect of this application, for a specific implementation and a brought beneficial effect of performing any one of the second aspect and the embodiments of the second aspect by the SIMD instruction processing apparatus, specifically refer to the first aspect. The SIMD instruction processing apparatus may further perform other embodiments of the first aspect. Details are not described herein again.

According to a third aspect, an embodiment of this application provides an SIMD instruction generation apparatus, which may be applied to an SIMD instruction generation field in a chip field. The apparatus includes: an obtaining module, configured to obtain a length of each loop dimension of a first tensor formula, where the obtaining module is further configured to obtain a plurality of groups of information about a first single instruction multiple data SIMD instruction model, where each group of information about a first SIMD instruction model corresponds to at least one loop dimension of one tensor formula, each group of information about a first SIMD instruction model includes a first constraint condition, and the first constraint condition is used to indicate a constraint condition of a length of each of the at least one loop dimension; a selection module, configured to select information about a second SIMD instruction model from the plurality of groups of information about a first SIMD instruction model based on the first constraint condition and the length of each loop dimension of the first tensor formula, where the information about a second instruction model matches the first tensor formula, and the length of the loop dimension of the first tensor formula meets the first constraint condition in the information about a second SIMD instruction model; and a generation module, configured to generate, based on a length of at least one loop dimension of the first tensor formula and the second SIMD instruction model, a first SIMD instruction obtained after the first tensor formula is converted.

A composition module of the SIMD instruction generation apparatus provided in the third aspect of this application may be further configured to perform operations performed by the SIMD instruction generation apparatus in the embodiments of the first aspect. For details, refer to the descriptions in any one of the first aspect and the embodiments of the first aspect. Details are not described herein.

According to a fourth aspect, an embodiment of this application provides an SIMD instruction processing apparatus. The apparatus may be applied to an SIMD instruction generation field in a chip field, and the apparatus includes: an obtaining module, configured to obtain a first parameter value and a second parameter value that correspond to a first SIMD instruction model, where the first parameter value is K and is used to indicate that the first SIMD instruction model includes K first parameters, K is an integer greater than or equal to 1, the second parameter value indicates a value constraint of the K first parameters, and the first parameter reflects a quantity of times of repeatedly performing an operation on a data object in a tensor formula matching the first SIMD instruction model; and a generation module, configured to generate information about a first SIMD instruction model based on the first parameter value and the second parameter value, where one piece of information about a first SIMD instruction model corresponds to one first SIMD instruction model, the information about a first SIMD instruction model includes first indication information and a first constraint condition, the first indication information is used to indicate a correspondence between the K first parameters and at least one loop dimension of the tensor formula matching the first SIMD instruction model, and the first constraint condition is used to indicate a constraint condition of a length of each of the at least one loop dimension.

A composition module of the SIMD instruction generation apparatus provided in the fourth aspect of this application may be further configured to perform operations performed by the SIMD instruction generation apparatus in the embodiments of the second aspect. For details, refer to the descriptions in any one of the second aspect and the embodiments of the second aspect. Details are not described herein.

According to a fifth aspect, an embodiment of this application provides an execution device, including a processor, where the processor is coupled to a memory; and a memory, configured to store a program. The processor is configured to execute the program in the memory, so that the execution device performs operations performed by the SIMD instruction generation apparatus in the embodiments of the first aspect.

According to a sixth aspect, an embodiment of this application provides an execution device, including a processor, where the processor is coupled to a memory; and a memory, configured to store a program. The processor is configured to execute the program in the memory, so that the execution device performs operations performed by the SIMD instruction generation apparatus in the embodiments of the second aspect.

According to a seventh aspect, an embodiment of this application provides a computer-readable storage medium. The computer-readable storage medium stores a computer program, and when the computer program runs on a computer, the computer is enabled to perform the SIMD instruction processing method in the first aspect; or the computer is enabled to perform the SIMD instruction processing method in the second aspect.

According to an eighth aspect, an embodiment of this application provides a computer program. When the computer program runs on a computer, the computer is enabled to perform the SIMD instruction processing method in the first aspect, or the computer is enabled to perform the SIMD instruction processing method in the second aspect.

According to a ninth aspect, this application provides a chip system. The chip system includes a processor and is configured to support a terminal device or a network device in implementing functions in the foregoing aspects, for example, sending or processing data and/or information in the foregoing method. In a possible design, the chip system further includes a memory. The memory is configured to store a program instruction and data that are necessary for the terminal device or the network device. The chip system may include a chip, or may include a chip and another discrete device.

BRIEF DESCRIPTION OF DRAWINGS

FIG. 4 is a schematic diagram of a correspondence between a first parameter and a loop dimension in an SIMD instruction processing method according to an embodiment of this application;

DESCRIPTION OF EMBODIMENTS

Embodiments of this application provide an SIMD instruction generation and processing method and a related device, to select information about a second SIMD instruction model from a plurality of groups of information about a first SIMD instruction model based on a length of each loop dimension of a tensor formula, and further generate, based on the second SIMD instruction model, a first SIMD instruction obtained after the first tensor formula is converted, to greatly improve efficiency of an SIMD instruction generation process.

The following describes embodiments of this application with reference to accompanying drawings. A person of ordinary skill in the art may learn that technical solutions provided in embodiments of this application are also applicable to a similar technical problem as a technology evolves and a new scenario emerges.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances. This is merely a distinguishing manner that is used when objects having a same attribute are described in embodiments of this application. In addition, the terms "include", "have", and any other variants thereof are intended to cover the non-exclusive inclusion, so that a process, method, system, product, or device that includes a series of units is not necessarily limited to those units, but may include other units not expressly listed or inherent to such a process, method, product, or device.

It should be understood that the SIMD instruction processing method provided in embodiments of this application may be applied to a process of developing various types of chips. The chip may be specifically represented as a central processing unit (CPU), an AI chip, or another type of chip. Further, the AI chip includes but is not limited to a neural-network processing unit (NPU), a graphics processing unit (GPU), an application-specific integrated circuit (ASIC), and a field programmable gate array (FPGA). In a process of developing the foregoing chips, a tensor formula can be automatically converted into an SIMD instruction in the SIMD instruction generation manner provided in embodiments of this application.

Figure 1:
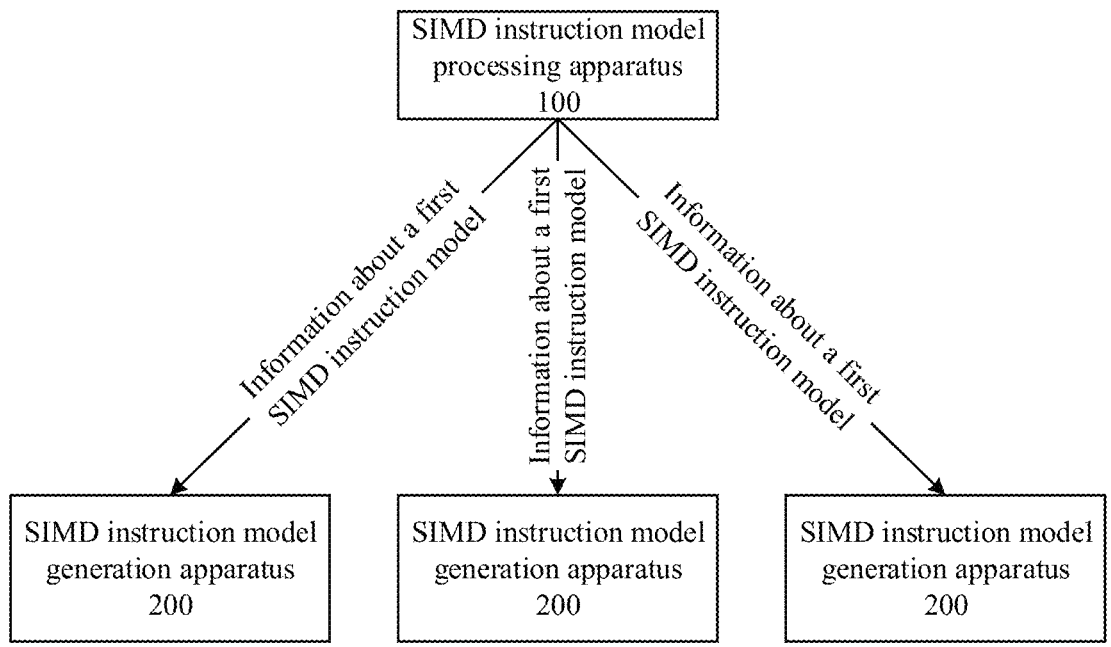
FIG. 1 is a diagram of a system architecture of an SIMD instruction processing system according to an embodiment of this application.

First, refer to FIG. 1. FIG. 1 is a diagram of a system architecture of an SIMD instruction processing system according to an embodiment of this application. FIG. 1 shows an SIMD instruction model processing apparatus 100 and an SIMD instruction model generation apparatus 200. The SIMD instruction model processing apparatus 100 is configured to: generate a software package including a plurality of groups of information about a first SIMD instruction model, and configure the software package in the SIMD instruction model generation apparatus 200. When the SIMD instruction model generation apparatus 200 needs to convert a first tensor formula into an SIMD instruction, the SIMD instruction model generation apparatus 200 obtains a length of each loop dimension of the first tensor formula, selects information about a second SIMD instruction model from a plurality of groups of information about a first SIMD instruction model based on the length of each loop dimension of the first tensor formula, where the information about a second instruction model matches the first tensor formula; and then generates a first SIMD instruction obtained after the first tensor formula is converted.

The SIMD instruction model processing apparatus 100 and the SIMD instruction model generation apparatus 200 may be integrated into a same device, or may be separately located in different devices. When the SIMD instruction model processing apparatus 100 and the SIMD instruction model generation apparatus 200 are integrated into a same device, the SIMD instruction model processing apparatus 100 may configure, in the SIMD instruction model generation apparatus 200 through a bus, the software package including a plurality of groups of information about a first SIMD instruction model. When the SIMD instruction model processing apparatus 100 and the SIMD instruction model generation apparatus 200 are located in different devices, the SIMD instruction model processing apparatus 100 may configure the software package in the SIMD instruction model processing apparatus through a wired network, a wireless network, or a removable storage medium.

Further, both the SIMD instruction model processing apparatus 100 and the SIMD instruction model generation apparatus 200 may be represented as devices having a communication function, for example, a desktop computer, a notebook computer, a personal digital assistant (PDA) computer, a tablet, a handheld device, a wearable device, or the like. This is not limited herein. It should be understood that, although FIG. 1 shows one SIMD instruction model processing apparatus 100 and three SIMD instruction model generation apparatuses 200, FIG. 1 is only used to facilitate understanding of this solution, but is not used to limit a quantity of apparatuses.

For ease of understanding of this solution, before the SIMD instruction processing method provided in embodiments of this application is described, the following terms that appear in embodiments of this application are first described:

A tensor formula includes one for loop or nesting of a plurality of for loops. An operation formula that needs to be executed in each for loop is defined in the for loop. The operation formula includes a tensor and an operator. Certainly, each for loop may further include a value range of a coordinate in the tensor. The tensor is multilinear mapping defined in terms of a Cartesian product of vector space and dual space. The operator in the tensor formula determines an operation type of the tensor formula, and an operation type of the first tensor formula may be specifically addition or multiplication.

Loop dimension: A tensor formula may be specifically expressed in a form of a for loop, one tensor formula may include a plurality of data objects, and one loop dimension of the tensor formula is one for loop in the tensor formula.

Length of a loop dimension: A length of one loop dimension in a tensor formula is an upper limit of a value of a coordinate in one for loop in the tensor formula.

SIMD instruction model: A format of the SIMD instruction model is the same as a format of the SIMD instruction. A difference lies in that a parameter value of each parameter in the SIMD instruction model is not determined, and a parameter value of each parameter in the SIMD instruction is determined.

Body and tail: When a chip performs batch calculation on a data object by invoking an SIMD instruction, a fixed quantity of data objects can be processed in each batch. If a quantity of to-be-processed data objects may be not exactly divided by the fixed quantity, the tail is set, a quantity of data objects existing in the tail is less than the fixed quantity, and a quantity of data objects existing in the body is equal to the fixed quantity; or if a quantity of to-be-processed data objects may be exactly divided by the fixed quantity, no tail exists.

A length of a first loop dimension is not exactly divided by a value range of the corresponding first parameter: One or more first parameters in an SIMD instruction are used to calculate one first loop dimension, and the one or more first parameters include a fifth parameter and a sixth parameter, and the fifth parameter is ranked before the sixth parameter in the one or more first parameters. Therefore, that the length of the first loop dimension is not exactly divided by the value range of the corresponding first parameter means that the length of the first loop dimension is not exactly divided by the value range of the fifth parameter, or the length of the first loop dimension is not exactly divided by a value product of the fifth parameter and the sixth parameter.

Figure 2:
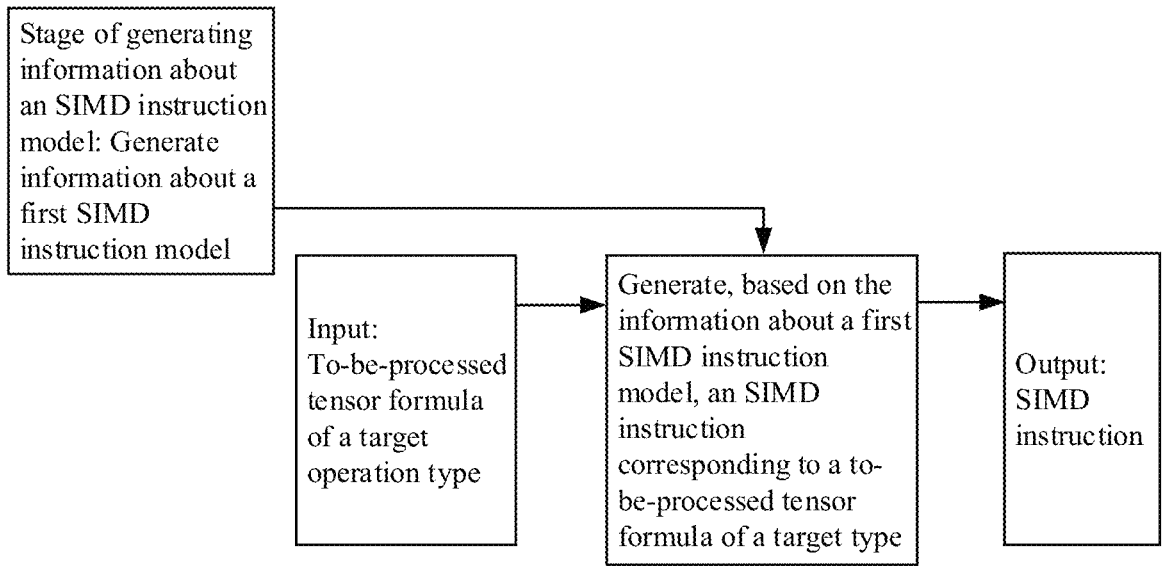
FIG. 2 is a schematic flowchart of an SIMD instruction processing method according to an embodiment of this application.

The following describes a specific implementation of embodiments of this application. FIG. 2 is a schematic flowchart of an SIMD instruction processing method according to an embodiment of this application. A solution provided in this embodiment of this application may be divided into a stage of generating information about an SIMD instruction model and a tensor formula conversion stage. In the stage of generating the information about an SIMD instruction model, an SIMD instruction processing apparatus generates a set of information about an SIMD instruction model. The set of information about an SIMD instruction model includes at least one piece of information about a first SIMD instruction model. In the tensor formula conversion stage, after obtaining a first tensor formula of one operation type of the first tensor formula, an SIMD instruction generation apparatus obtains, based on the information that is about a first SIMD instruction model and that is generated in advance, an SIMD instruction model matching the first tensor formula, and then generates an SIMD instruction corresponding to the first tensor formula. The following describes specific implementation procedures of the stage of generating information about an SIMD instruction model and the tensor formula conversion stage in the SIMD instruction processing method provided in embodiments of this application.

1. Stage of Generating Information about an SIMD Instruction Model

Figure 3:
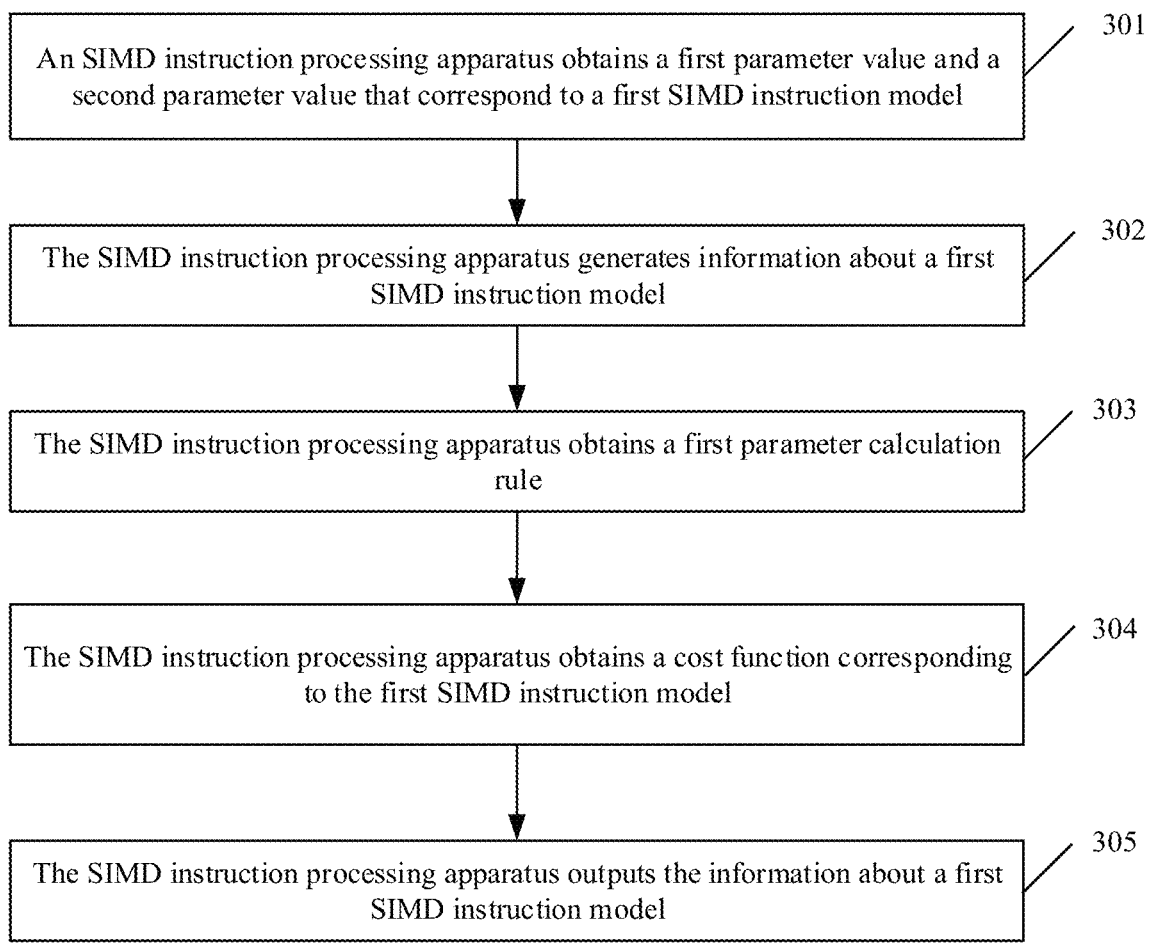
FIG. 3 is another schematic flowchart of an SIMD instruction processing method according to an embodiment of this application.

In an embodiment of this application, FIG. 3 is a schematic flowchart of a single instruction multiple data SIMD instruction processing method according to an embodiment of this application. The single instruction multiple data SIMD instruction processing method provided in this embodiment of this application may include the following operations.

Operation 301: An SIMD instruction processing apparatus obtains a first parameter value and a second parameter value that correspond to a first SIMD instruction model.

In this embodiment of this application, because a chip may support one or more types of SIMD instructions, the SIMD instruction processing apparatus selects an SIMD instruction of a target type from the one or more types of SIMD instructions. Generation of information about a first SIMD instruction model of a target type is used as a target of one generation operation. For a specific representation form of the chip, refer to the foregoing description. Details are not described herein again. The SIMD instruction of the target type is one of the one or more types of SIMD instructions supported by the chip, each type of SIMD instruction corresponds to a tensor formula of one operation type, and different types of SIMD instructions have different SIMD instruction formats. When the SIMD instruction of the target type is invoked by the chip, the SIMD instruction is used to implement an operation of the tensor formula of a target operation type. Further, the tensor formula is a calculation formula including a tensor and an operator, and the tensor is multilinear mapping defined in terms of a Cartesian product of vector space and dual space. A zeroth-order tensor may be referred to as a scalar, and a first-order tensor may be referred to as a vector. The operator in the tensor formula determines an operation type of the tensor formula, and the target operation type may be specifically addition, multiplication, or another operation type.

To further understand this solution, the SIMD instruction in this embodiment of this application is presented by using the following formula:

$$\text{SIMD\_OP}([dst_i],[src_j],[repeat_k],[dstStride_{i,k}],[src\text{-}Stride_{j,k}],[other_z]) \qquad (1)$$

Herein, OP represents an operator (operator), $[dst_i]$ (i=0, 1, ..., I−1) represents a destination address set of a data object corresponding to the SIMD instruction, i is an integer greater than or equal to 0, $[src_j]$ (j=0, 1, ..., J−1) represents a source address set of a data object corresponding to the SIMD instruction, j is an integer greater than or equal to 0, $[repeat_k]$ (k=0, 1, ..., K−1) represents K first parameters in this embodiment of this application, the first parameter is $repeat_k$, a value of the first parameter reflects a quantity of times of repeatedly performing an operation on a data object when the chip executes the parameter $repeat_k$, K is an integer greater than or equal to 1, operations performed on the data object include reading, calculation, and writing, $0 \leq repeat_k \leq R_k$, (k=0, 1, ..., K−1), $R_k$ represents an upper limit of a value of $repeat_k$, the value of $R_k$ is determined by the chip, the chip performs, in a sequence of ($[0, repeat_0]$, $[0, repeat_1]$, ..., $[0, repeat_{K-1}]$) in a process of executing the SIMD instruction shown in Formula (1), an operation on the data object corresponding to the SIMD instruction, $[dstStride_{i,k}]$ (i=0, 1, ..., I−1; k=0, 1, ..., K−1) represents an address stride that is of a destination address $dst_i$ corresponding to the data object and that exists when the chip executes a specific parameter $repeat_k$, $[srcStride_{j,k}]$ (j=0, 1, ..., J−1; k=0, 1, ..., K−1) represents an address stride that is of a source address $src_j$ corresponding to the data object and that exists when the chip executes a specific parameter $repeat_k$, $[other_z]$ (z=0, 1, ..., Z−1) is another parameter, and z is an integer greater than or equal to 0. It should be understood that Formula (1) is merely an example for ease of understanding of the SIMD instruction. In another implementation, A ranking order of each parameter in the SIMD instruction may be different from that in Formula (1), or a parameter in the SIMD instruction may be added or deleted based on Formula (1). This is not limited herein.

The tensor formula in this embodiment of this application is presented by using the following formula:

for $(x_0, x_1, ..., x_{H-1})$ in $(X_0, X_1, ..., X_{H-1})$:

$$[D_i(x_0, x_1, ..., x_{H-1})] = OP([S_j(x_0, x_1, ..., x_{H-1})]) \qquad (2)$$

The tensor formula may be specifically represented in a form of a for loop, one loop dimension of the tensor formula is a dimension in which a coordinate of one data object in the tensor formula in the form of a for loop is located, Formula (2) shows a tensor formula including H loop dimensions, $(x_0, x_1, ..., x_{H-1})$ represents coordinates of a tensor $D_i$ and coordinates of a tensor $S_j$, i=0, 1, ..., I−1, I is an integer greater than or equal to 0, a value of I represents a quantity of destination addresses in the tensor formula, j=0, 1, ..., J−1, J is an integer greater than or equal to 0, a value of J represents a quantity of source addresses in the tensor formula, OP represents an operator (which may also be referred to as an operation type), $(X_0, X_1, ..., X_{H-1})$ includes H values of $X_\theta$, $X_\theta = [0, E_\theta]$, ($\theta$=0, 1, ..., H−1), $E_\theta$ is a nonnegative integer, and represents a length of a $\theta^{th}$ loop dimension of the tensor formula, $x_\theta \in X_\theta$, and a length of one loop dimension of tensor formula is related to a value range of one data object in the tensor formula.

An equivalent linearization expression form of Formula (2) is as follows:

for $(x_0, x_1, ..., x_{H-1})$ in $(X_0, X_1, ..., X_{H-1})$:

$$[D_i(\Sigma_{p=0}^{H-1} a_p^i \times x_p)] = OP([S_j(\Sigma_{p=0}^{H-1} b_p^j \times x_p)]) \qquad (3)$$

Herein, $a_p^i$ represents a coordinate linearization coefficient of the tensor $D_i$, $x_p$ represents any parameter in $(x_0, x_1, ..., x_{H-1})$, and $b_p^j$ represents a coordinate linearization coefficient of the tensor $S_j$.

Further, a specific example of the tensor formula is shown below:

$$\begin{aligned}
&\text{for } (x5, 0, 6) \ \{ \\
&\quad \text{for } (x0, 0, 16) \ \{ \\
&\quad\quad \text{for } (x4, 0, 6) \ \{ \\
&\quad\quad\quad \text{for } (x3, 0, 4) \ \{ \\
&\quad\quad\quad\quad \text{for } (x2, 0, 6) \ \{ \\
&\quad\quad\quad\quad\quad \text{for } (x1, 0, 4) \ \{ \\
&\quad\quad\quad\quad\quad\quad D_0[((((((x5*5776) + (x4*912)) - (x3*304)) + \\
&\quad\quad (x2*48)) - (x1*16)) + x0) + 960)] \\
&\quad\quad\quad\quad\quad\quad = S_0 \ ((((((x5*5776) + (x4*912)) - (x3*304)) + \\
&\quad\quad (x2*48)) - (x1*16)) + x0) + 960)] \\
&\quad\quad\quad\quad\quad\quad + S_1 \ [((((((x5*576) + (x4*96)) + (x3*0)) + \\
&\quad\quad (x2*16)) + (x1*0)) + x0) + 0)] \\
&\quad\quad\quad\quad\quad \} \\
&\quad\quad\quad\quad \} \\
&\quad\quad\quad \} \\
&\quad\quad \} \\
&\quad \} \\
&\}
\end{aligned} \qquad (4)$$

Formula (4) is a tensor formula including six loop dimensions, in other word, H=6, the tensor $D_0$, the tensor $S_0$, and a tensor $S_1$ each include $(x_0, x_1, x_2, x_3, x_4, x_5)$, there is one destination address and two source addresses in the tensor formula shown in Formula (4), a value of a length $E_0$ of a loop dimension in which $x_0$ is located is 16, a value of a length $E_1$ of a loop dimension in which $x_1$ is located is 4, a value of a length $E_2$ of a loop dimension in which $x_2$ is located is 6, a value of a length $E_3$ of a loop dimension in which $x_3$ is located is 4, a value of a length $E_4$ of a loop dimension in which $x_4$ is located is 6, a value of a length $E_5$ of a loop dimension in which $x_5$ is located is 6, a value of $a_0^0$ is 1, a value of $a_1^0$ is 16, a value of $a_2^0$ is 48, a value of $a_3^0$ is 304, a value of $a_4^0$ is 912, a value of as is 5776, a value of $b_0^0$ is 1, a value of $b_1^0$ is 16, a value of $b_2^0$ is 48, a value of $b_3^0$ is 304, a value of $b_4^0$ is 912, a value of $b_5^0$ is 5776, a value of $b_0^1$ is 1, a value of $b_1^1$ is 0, a value of $b_2^1$ is 16, a value of $b_3^1$ is 0, a value of $b_4^1$ is 96, and a value of $b_5^1$ is 576. It should be understood that the examples of the tensor formula in Formula (2), Formula (3), and Formula (4) are only for ease of understanding of this solution, and are not used to limit this solution.

The SIMD instruction processing apparatus obtains a first parameter value and a second parameter value that correspond to the SIMD instruction of the target type. The first parameter value is K, and is used to indicate that the SIMD instruction of the target type includes K first parameters. The target function is $repeat_k$ in Formula (1). The second parameter value is used to indicate a value constraint of the K first parameters in the chip, and the second parameter value is K values of $R_k$ in the foregoing formula (1). When the chip executes the SIMD instruction of the target operation type, the tensor formula of the target operation type can be implemented, the K first parameters correspond to N loop dimensions in the tensor formula of the target operation type, and N is an integer less than or equal to K and greater than or equal to 1. Further, the chip may calculate a loop dimension of the tensor formula by using a one-dimensional or multi-dimensional first parameter. It should be noted that, the tensor formula of the target operation type may include H loop dimensions, and H is an integer greater than or equal to N.

Specifically, in an implementation, after learning of a specification and performance of the chip, a user may learn of the first parameter value and the second parameter value that correspond to the SIMD instruction of the target type in the chip. Further, the SIMD instruction processing apparatus may receive the first parameter value and the second parameter value that are entered by the user. More specifically, an input box including the first parameter value and the second parameter value may be directly presented in a presentation interface of the SIMD instruction processing apparatus, so that the user enters the first parameter value and the second parameter value by using the input box. The SIMD instruction processing apparatus may alternatively receive a file that includes the first parameter value and the second parameter value and that is entered by the user, so that the SIMD instruction processing apparatus may extract the input box of the first parameter value and the second parameter value from the file. The file may be specifically represented as a text document, a table document, program code, a file in another format, or the like. In another implementation, the SIMD instruction processing apparatus may further receive an SIMD instruction model that is of the target type in the chip and that is entered by the user, and the SIMD instruction processing apparatus parses the SIMD instruction model to obtain a parameter value of the first parameter. A manner in which the SIMD instruction processing apparatus obtains the second parameter value is similar to that in the foregoing implementation. Details are not described herein again.

Optionally, the SIMD instruction processing apparatus obtains a third parameter value, and the third parameter value is used to indicate a constraint on a quantity of bodies (Body) in the SIMD instruction of the target type. The SIMD instruction processing apparatus may implement an operation of the tensor formula based on SIMD instructions in a body part and a tail (Tail) part. Further, when the chip performs batch calculation on a data object by invoking the SIMD instruction, a fixed quantity of data objects can be processed in each batch. If a quantity of to-be-processed data objects may be not exactly divided by the fixed quantity, the tail is set, a quantity of data objects existing in the tail is less than the fixed quantity, and a quantity of data objects existing in the body is equal to the fixed quantity; or if a quantity of to-be-processed data objects may be exactly divided by the fixed quantity, no tail exists. In an example, reference is made to the following formulas:

for $(x_N, x_{N+1}, \ldots, x_{H-1})$ in $(X_N, X_{N+1}, \ldots, X_{H-1})$:
for $(y_0^b, y_1^b, \ldots, y_{K-1}^b)$ in $(Y_0^b, Y_1^b, \ldots, Y_{K-1}^b)$:

$$\text{SIMD\_OP}([D_i(\Sigma_{p=N}^{H-1} a_p^i \times x_p + \Sigma_{k=0}^{K-1} B_{i,k}^D \times y_k^b)], [S_j(\Sigma_{p=N}^{H-1} b_p^j \times x_p + \Sigma_{k=0}^{K-1} B_{j,k}^S \times y_k^b)], [\text{repeat}_k^{body}], [\text{dstStride}_{i,k}], [\text{srcStride}_{j,k}]) \quad (5)$$

for$(y_0^t, y_1^t, \ldots, y_{K-1}^t)$ in$(Y_0^t, Y_1^t, \ldots, Y_{K-1}^t)$:

$$\text{SIMD\_OP}([D_i(\Sigma_{p=N}^{H-1} a_p^i \times x_p + \Sigma_{k=0}^{K-1} T_{i,k}^D \times y_k^t)], [S_j(\Sigma_{p=N}^{H-1} b_p^j \times x_p + \Sigma_{k=0}^{K-1} T_{j,k}^S \times y_k^t)], [\text{repeat}_k^{tail}], [\text{dstStride}_{i,k}], [\text{srcStride}_{j,k}]) \quad (6)$$

The foregoing formulas show that an operation of H loop dimensions of the tensor formula is jointly implemented by using a group of SIMD instructions in Formula (5) and Formula (6) in combination with a For-x loop, Formula (5) in the foregoing formulas represents a body part of the group of SIMD instructions, Formula (6) in the foregoing formula represents a tail part of the group of SIMD instructions, $x_p$ represents any parameter in $(x_N, x_{N+1}, \ldots, x_{H-1})$, $a_p^i$ represents a coordinate linearization coefficient of $x_p$ in a tensor $D_i$, $y_k^b$ represents any parameter in $(y_0^b, y_1^b, \ldots, y_{K-1}^b)$ represents a quantity of K first parameters in the body part of the group of SIMD instructions, $y_k^b \in Y_k^b$, $Y_k^b=[0, F_k^b)$, (k=0, 1, . . . , K-1), $F_k^b$ represents an upper limit of a quantity of bodies of the parameter $\text{repeat}_k$ in the SIMD instruction of the target type in the chip, $F_k^b$ is an integer greater than or equal to 0, $B_{j,k}^S$ represents an address stride of y in a destination address $D_i$ of the body part of the group of SIMD instructions, $b_p$ represents a coordinate linearization coefficient of $x_p$ in a tensor $S_j$, $B_{j,k}^S$ represents an address stride of y in a source address $S_j$ of the body part of the group of SIMD instructions, $[\text{repeat}_k^{body}]$ represents the K first parameters in the body part of the group of SIMD instructions, a value of $[\text{repeat}_k^{body}]$ reflects a quantity of times of repeatedly performing an operation on a data object when the chip executes the K first parameters in the body part of the group of SIMD instructions, $[\text{dstStride}_{i,k}]$ represents an address stride of a destination address $\text{dst}_i$ corresponding to the data object when the chip executes a specific parameter $\text{repeat}_k$, $[\text{srcStride}_{j,k}]$ (j=0, 1, . . . , J-1; k=0, 1, . . . , K-1) represents an address stride that is of a source address $\text{src}_j$ corresponding to the data object and that exists when the chip executes a specific parameter $\text{repeat}_k$, $y_k^t$ represents any parameter in $(y_0^t, y_1^t, \ldots, y_{K-1}^t)$, $(y_0^t, y_1^t, \ldots, y_{K-1}^t)$ represents a quantity of K first parameters in the tail part of the group of SIMD instructions, $y_k^t \in Y_k^t$, $Y_k^t=[0, F_k^t)$, (k=0, 1, . . . , K-1), $F_k^b$ represents an upper limit on a quantity of tails of the parameter $\text{repeat}_k$ in the SIMD instruction of the target type in the chip, a value of $F_k^t$ is 0 or 1, when $F_k^t=0$, it represents no tail exists, when $F_k^t=1$, it represents that a tail exists, $T_{i,k}^D$ represents an address stride of $y_k^t$ in a destination address $D_i$ of the tail part of the group of SIMD instructions, $T_{j,k}^S$ represents an address stride of $y_k^t$ in a source address $S_j$ in the tail part of the group of SIMD instructions, $[\text{repeat}_k^{tail}]$ represents the K first parameters in the tail part of the group of SIMD instructions, and a value of $[\text{repeat}_k^{tail}]$ reflects a quantity of times of repeatedly performing an operation on a data object when the chip executes the K first parameters in the tail part of the group of SIMD instructions. It should be understood that, in other embodiments, the operation of the tensor formula may also be implemented by using only the body part and the tail part of the group of SIMD instructions, without a need to be combined with a For loop. Alternatively, the operation of the tensor formula may be implemented only by using the body part, without requiring the tail part, or the like. The foregoing examples are merely for ease of understanding of concepts of the body and the tail, and are not used to limit this solution.

A group of SIMD instructions is used to calculate N loop dimensions in a tensor formula. Correspondingly, a body part of the group of SIMD instructions includes N types of bodies, and each type of body corresponds to one of the N loop dimensions. A tail part of the group of SIMD instructions includes N tails, each tail corresponds to one of the N loop dimensions, and N is an integer greater than or equal to 1. The constraint that is on the quantity of bodies in the SIMD instruction of the target type and that is included in the third parameter is an upper limit on a quantity of bodies corresponding to a second loop dimension in the N types of bodies. In an example, the third parameter also includes the constraint on the quantity of bodies in the SIMD instruction of the target type. A value of the constraint on the quantity of bodies is 5. A group of SIMD instructions of the target type is used to implement an operation of two loop dimensions of the tensor formula. In this case, an upper limit of a quantity of bodies that correspond to a second loop dimension in the tensor formula and that are in a body part of the SIMD instruction of the target type is 5. It should be understood that this example is merely for ease of understanding of this solution, and is not used to limit this solution.

Specifically, a manner in which the SIMD instruction processing apparatus obtains the third parameter is similar to a manner in which the SIMD instruction processing apparatus obtains the second parameter. In an implementation, the SIMD instruction processing apparatus may receive, by using the input box, the third parameter value entered by the user. In another implementation, the SIMD instruction processing apparatus may receive a file that includes the third parameter value and that is entered by the user.

Optionally, the SIMD instruction processing apparatus obtains a fourth parameter value. The fourth parameter value is used to indicate a quantity of destination addresses in the SIMD instruction of the target type and a quantity of source addresses in the SIMD instruction of the target type. The quantity of destination addresses in the SIMD instruction of the target type is also a value of I in Formula (1), and the quantity of source addresses in the SIMD instruction of the target type is also a value of J in Formula (1). For example, if an SIMD instruction includes $dst_0$, $src_0$, and $src_1$, there is one destination address and two source addresses in the SIMD instruction. It should be understood that the examples herein are merely for ease of understanding of this solution, and are not used to limit this solution.

Specifically, a manner in which the SIMD instruction processing apparatus obtains the fourth parameter is similar to a manner in which the SIMD instruction processing apparatus obtains the first parameter. In an implementation, the SIMD instruction processing apparatus may receive, by using the input box, the fourth parameter value entered by the user. In another implementation, the SIMD instruction processing apparatus may receive a file that includes the fourth parameter value and that is entered by the user. In another implementation, the SIMD instruction processing apparatus may receive the SIMD instruction model that is of the target type in the chip and that is entered by the user, and extract the fourth parameter value from the SIMD instruction model.

Operation 302: The SIMD instruction processing apparatus generates information about a first SIMD instruction model.

In this embodiment of this application, after performing operation 301, the SIMD instruction processing apparatus may generate at least one group of information about a first SIMD instruction model based on the parameter obtained in operation 301. The information about a first SIMD instruction model is used to indicate to perform an SIMD instruction conversion operation on the tensor formula of the target operation type based on the information about a first SIMD instruction model. Each group of information about a first SIMD instruction model correspond to one first SIMD instruction model, the first SIMD instruction model is used to generate the SIMD instruction of the target type, and a format of one first SIMD instruction model is the same as a format of the SIMD instruction of the target type. A difference lies in that a parameter value of each parameter in the first SIMD instruction model is not determined, and a parameter value of each parameter in the SIMD instruction is determined. Each group of information about a first SIMD instruction model includes first indication information and a first constraint condition, one piece of first indication information is used to indicate a correspondence between K first parameters included in one first SIMD instruction model and N loop dimensions in a tensor formula matching the information about a first SIMD instruction model, and one first constraint condition is used to indicate a constraint condition of lengths of N loop dimensions in the tensor formula matching the information about a first SIMD instruction model in case of the correspondence indicated by the first indication information.

Further, at least one group of information about a first SIMD instruction model includes a plurality of types of information about an SIMD instruction model, different types of information about an SIMD instruction model correspond to different values of N, and N is an integer greater than or equal to 1. In this embodiment, category division is performed on the at least one group of information about a first SIMD instruction model based on a quantity of loop dimensions that corresponds to the information about a first SIMD instruction model, to help separately manage different types of information about a first SIMD instruction model subsequently, so as to improve management precision. The first constraint condition is related to a chip type, and different types of chips may correspond to different first constraint conditions. In this embodiment of this application, a set of information about an SIMD instruction model is generated based on a specific chip, and different chips generate different information about an SIMD instruction model, so that not only an application scenario of this solution is extended, but also a degree at which an SIMD instruction model fits a chip is improved. Optionally, the information about a first SIMD instruction model may further include a third constraint condition, and the third constraint condition is used to indicate a constraint on a value of an address stride in the SIMD instruction model in a case of the correspondence indicated by the first indication information.

Specifically, in one case, if only the first parameter and the second parameter are obtained in operation 301, and the third parameter (namely, a constraint on a quantity of bodies in the SIMD instruction of the target type) and the fourth parameter (namely, the quantity of destination addresses and the quantity of source addresses in the SIMD instruction of the target type) are not obtained, the SIMD instruction processing apparatus may consider by default that there is one body and zero tail. Operation 302 may include: The SIMD instruction processing apparatus generates, based on the first parameter, the first indication information included in the information about a first SIMD instruction model; and the SIMD instruction processing apparatus generates, based on the first indication information and the second parameter, the first constraint condition included in the information about a first SIMD instruction model.

More specifically, for a process of generating the first indication information, there are a total of K parameters $repeat_k$ in the SIMD instructions of the target type in a target chip, and $repeat_k$ may be in a one-to-one correspondence or a many-to-one correspondence with a loop dimension in the tensor formula of the target operation type; but the K parameters $repeat_k$ may be randomly arranged and combined, and therefore, a value of N may be any value from 1 to K. After learning of a value of K, the SIMD instruction processing apparatus may arrange and combine the K parameters $repeat_k$ in the SIMD instruction of the target type, so that a maximum of $2^{K-1}$ correspondences between the K parameters $repeat_k$ and N loop dimensions can be generated. In other words, a maximum of $2^{K-1}$ pieces of first indication information can be obtained. Each first indication information may indicate to generate one first SIMD instruction model. In other words, there may be correspondingly a maximum of $2^{K-1}$ first SIMD instruction models.

Further, if the K parameters $repeat_k$ in the SIMD instruction of the target type represent one loop dimension of the target operation type (in other words, the value of N is 1), there is one correspondence between the K parameters $repeat_k$ and one loop dimension. If the K parameters $repeat_k$ in the SIMD instruction of the target type represent K' loop dimensions of the target operation type (in other words, the value of N is K'), and K' is an integer greater than 1 and less than K, there are $C_{K-1}^{K'-1}$ correspondences between the K parameters $repeat_k$ and K' loop dimensions. In other words, there may be correspondingly $C_{K-1}^{K'-1}$ SIMD instruction models. The SIMD instruction processing apparatus may generate the $C_{K-1}^{K'-1}$ correspondences through enumeration. If the K parameters $repeat_k$ in the SIMD instruction of the target type represent K loop dimensions of the target operation type (in other words, the value of N is K), there is one correspondence between the K parameters $repeat_k$ and the K loop dimensions. In an example, for example, if the value of K is 3, there may be four correspondences between the K parameters $repeat_k$ and the N loop dimensions (in other words, there are four pieces of first indication information). In the first correspondence, three dimensions of $repeat_k$ jointly represent one loop dimension. In the second correspondence, the first two dimensions of $repeat_k$ are used to represent one loop dimension, and the last one dimension of $repeat_k$ is used to represent one loop dimension. In the third correspondence, the first one dimension of $repeat_k$ is used to represent one loop dimension, and the last two dimensions are used to represent one loop dimension. In the fourth correspondence, three dimensions of $repeat_k$ respectively represent three loop dimensions.

To more intuitively display a correspondence between a first parameter and a loop dimension, refer to FIG. 4. FIG. 4 is a schematic diagram of a correspondence between a first parameter and a loop dimension in an SIMD instruction processing method according to an embodiment of this application. Herein, K' is a value of N, and represents that K parameters $repeat_k$ in the SIMD instruction of the target type are grouped into K' groups, and the K' groups are separately used to represent K' loop dimensions in the tensor formula of the target operation type. As shown in the figure, $repeat_0$ and $repeat_1$ are used to represent the 1$^{st}$ loop dimension in the K' loop dimensions in the tensor formula of the target operation type, $repeat_2$ to $repeat_6$ are used to represent the second loop dimension in the K' loop dimensions in the tensor formula of the target operation type, $repeat_{K-3}$ and $repeat_{K-2}$ are used to represent the (K'- 1)$^{th}$ loop dimension in the K' loop dimensions in the tensor formula of the target operation type, $repeat_{K-1}$ is used to represent the (K')$^{th}$ loop dimension in the K' loop dimensions in the tensor formula of the target operation type, and the like. FIG. 4 intuitively presents the correspondence between a first parameter and a loop dimension. A correspondence of another loop dimension in the K' loop dimensions is not described again herein. It should be understood that the example in FIG. 4 is only for ease of understanding of a concept of the first indication information, and is not used to limit this solution.

For a process of generating the first constraint condition, to ensure that the correspondence indicated by the first indication information is implementable, the SIMD instruction processing apparatus further needs to generate $2^{K-1}$ first constraint conditions that are in a one-to-one correspondence with $2^{K-1}$ pieces of first indication information. If K parameters $repeat_k$ in the SIMD instruction are used to represent one loop dimension $x_k$ in the SIMD instruction of the target operation type, and a length of the loop dimension $x_k$ is $E_k$, a constraint condition $E_0 \leq \Pi_{k=0}^{K-1} R_k$ needs to be met. In other words, the length of the loop dimension in the tensor formula needs to be less than or equal to an upper limit of a product of K first parameters. A constraint condition $\Pi_{\eta=0}^{M_k^s-1} R_{m_\eta^{k,s}} \geq E_k$, (k=0, ..., K'- 1) needs to be met if the K parameters $repeat_k$ are used to represent K' loop dimensions, K' is an integer greater than 1 and less than K, there are $C_{K-1}^{K'-1}$ correspondences between the K parameters $repeat_k$ and the K' loop dimensions, and in the s$^{th}$ ($0 \leq s < C_{K-1}^{K'-1}$) correspondence in the $C_{K-1}^{K'-1}$ correspondences, any loop dimension $x_k$ ($0 \leq k < K'$) in the tensor formula of the target operation type is represented by using $M_k^s$ parameters repeat, namely, $[repeat_{m_\eta^{k,s}}]$, $m_\eta^{k,s} = \eta + \Sigma_{\zeta=0}^{k-1} M_\zeta^s$ ($\eta=0, 1, ..., M_k^s-1$), $\eta$ represents any value from 0 to $M_k^s-1$, $\zeta$ represents a subscript of $M_\zeta^s$ in a summation expression $\Sigma_{\zeta=0}^{k-1} M_\zeta^s$, and $\zeta=0, 1, ..., k-1$. If the K parameters $repeat_k$ in the SIMD instruction are used to represent K loop dimensions $x_k$ in the tensor formula of the target operation type, in other words, each dimension $repeat_k$ in the SIMD instruction is used to represent one loop dimension $x_k$ in the tensor formula of the target operation type, and a length of the loop dimension $x_k$ is $E_k$, a constraint condition $E_k \leq R_k$ needs to be met. In other words, the length of the loop dimension in the tensor formula needs to be less than or equal to an upper limit of a value of $repeat_k$. For a more intuitive feeling of the first constraint condition, a form of a table is presented below:

TABLE 1

| Value of N | First constraint condition |
|---|---|
| K | $E_k \leq R_k$, (k = 0, 1, ..., K - 1) |
| ... | ... |
| K' | $E_k \leq \Pi_{\eta=0}^{M_k^s-1} R_{m_\eta^{k,s}}$ <br> (k = 0, 1, ..., K'- 1, s = 0, 1, ..., $C_{K-1}^{K'-1}$ - 1) <br> $m_\eta^{k,s} = \eta + \Sigma_{\zeta=0}^{k-1} M_\zeta^s$ ($\eta$ = 0, 1, ..., $M_k^s$ - 1) |
| ... | ... |
| 1 | $E_0 \leq \Pi_{k=0}^{K-1} R_k$ |

Table 1 more intuitively presents a specific presentation form of the first constraint condition in a case of the correspondence indicated by the first indication information. Detailed description is provided before Table 1 by using a text part, and is not described herein again.

In another case, the first parameter, the second parameter, and the third parameter (namely, the constraint on the quantity of bodies in the SIMD instruction of the target type in the chip) are obtained in operation 301, and the fourth parameter (namely, the quantity of destination addresses and the quantity of source addresses in the SIMD instruction of the target type) is not obtained, operation 302 may include: The SIMD instruction processing apparatus generates the first indication information based on the first parameter value; and the SIMD instruction processing apparatus generates the first constraint condition based on the first indication information, the second parameter value, and the third parameter value. In this embodiment of this application, a constraint on a quantity of bodies in an SIMD instruction of a target type in the chip is obtained in advance, and a constraint condition used to indicate the length of the loop dimension of the tensor calculation type is generated with reference to the constraint on the quantity of bodies. A value range of the length of the loop dimension in the constraint condition may be enlarged by using the body and tail technology, to extend an applicable scope of this solution.

Specifically, for a specific implementation in which the SIMD instruction processing apparatus generates one or more pieces of first indication information based on the first parameter value, refer to the description in the foregoing case. Details are not described herein. For a case in which the SIMD instruction processing apparatus generates the first constraint condition based on the first indication information, the second parameter value, and the third parameter value, and for impact of the quantity of bodies in the three parameters on the first constraint condition, it is assumed that the constraint on the quantity of bodies in the SIMD instruction of the target type in the chip is $Y_k^b$ ($Y_k^b$=[0, $F_k^b$), (k=0, 1, . . . , K−1, $\overline{F_k^b}$≤$F_k^b$)), where $F_k^b$ represents the upper limit of the quantity of bodies in the SIMD instruction of the target type in the chip, and $\overline{F_k^b}$ represents a constraint on the quantity of bodies in the SIMD instruction of the target type in the third parameter. In this case, a constraint $R_k$ in the first restriction condition is relaxed to $R'_k$=$\overline{F_k^b}$×$R_k$. It can be learned from the foregoing formula that a body is set to extend an upper limit value of $R_k$ in the first constraint condition in a multiplexed manner. Further, the SIMD instruction of the target type is used to calculate the N loop dimensions in the tensor calculation, and an upper limit of a constraint on the second loop dimension is relaxed by using the body and tail technology. In an example, if the value of N is 2, and the first constraint condition existing before extension is $E_0$≤16×4, $E_1$≤8, and the upper limit of the quantity of bodies is 5, the first constraint condition obtained after extension is $E_0$≤16×4, $E_1$≤8×5. In other words, only a constraint condition corresponding to the $N^{th}$ (namely, second) loop dimension is extended.

In another case, if the first parameter, the second parameter, and the fourth parameter (namely, the quantity of destination addresses and the quantity of source addresses in the SIMD instruction of the target type) are obtained in operation 301, and the third parameter (namely, the constraint on the quantity of bodies in the SIMD instruction of the target type) is not obtained, the SIMD instruction processing apparatus may set the quantity of bodies to one by default. Operation 302 may include: The SIMD instruction processing apparatus generates the first indication information based on the first parameter value; generates the first constraint condition based on the first indication information and information about a second parameter; and generates the second constraint condition based on a fourth parameter value. For a subset of information about an SIMD instruction model, the entire subset of information about an SIMD may include only one second constraint condition, or each group of information about a first SIMD instruction model may include the second constraint condition. The second constraint condition is used to indicate the quantity of destination addresses in the tensor formula of the target operation type and the quantity of source addresses in the tensor formula of the target operation type. In this embodiment of this application, the quantity of destination addresses and the quantity of source addresses in the SIMD instruction of the target type in the chip are obtained in advance, and the second constraint condition is generated. The second constraint condition is used to indicate the quantity of destination addresses and the quantity of source addresses in the tensor formula of the target operation type. Therefore, whether an SIMD instruction model matches a to-be-converted tensor formula can be preliminarily determined based on the second constraint condition, to avoid a waste of computer resources, and help improve efficiency of a tensor formula conversion stage.

Specifically, for a specific implementation in which the SIMD instruction processing apparatus generates the first indication information based on the first parameter value and a specific implementation in which the SIMD instruction processing apparatus generates the first constraint condition based on the first indication information and the second parameter information, refer to the specific implementation in which the SIMD instruction processing apparatus obtains only the first parameter and the second parameter in operation 301. Details are not described herein again. For a specific implementation in which the SIMD instruction processing apparatus generates one or more second constraint conditions based on the fourth parameter value, after the SIMD instruction processing apparatus obtains the quantity of destination addresses and the quantity of source addresses in the SIMD instruction of the target type, the SIMD instruction processing apparatus may determine the quantity of destination addresses in the SIMD instruction of the target type as a quantity of destination addresses in the tensor formula of the target operation type in the second constraint condition, and determine the quantity of source addresses in the SIMD instruction of the target type as a quantity of source addresses in the tensor formula of the target operation type in the second constraint condition. In an example, if there is one destination address and two source addresses in the SIMD instruction of the target type, a constraint quantity of destination addresses in the tensor formula of the target operation type in the second constraint condition is limited to 1, and a constraint quantity of source addresses in the tensor formula of the target operation type in the second constraint condition is limited to 2. It should be understood that the example herein is merely for each of understanding of this solution, and is not intended to limit this solution.

In another case, if the first parameter, the second parameter, the third parameter, and the fourth parameter are obtained in operation 301, operation 302 may include: The SIMD instruction processing apparatus generates one or more pieces of first indication information based on the first parameter value; generates one or more first constraint conditions based on the first indication information and the second parameter information; and generates one second constraint condition based on the fourth parameter value. For a specific implementation in which the SIMD instruction processing apparatus performs the foregoing operation, refer to the descriptions in the foregoing three cases. Details are not described herein.

Operation 303: The SIMD instruction processing apparatus obtains a first parameter calculation rule.

In some embodiments of this application, the SIMD instruction processing apparatus may further generate one or more first parameter calculation rules corresponding to the information about a first SIMD instruction model. The first parameter calculation rule is used by the SIMD instruction generation apparatus to generate parameter values of the first parameter, the address stride of the destination address, and the address stride of the source address in the SIMD instruction model according to the first parameter calculation rule. A quantity of first parameter calculation rules may be the same as a quantity of first constraint conditions, and the first parameter calculation rule is used to indicate parameter value calculation rules of the first parameter, the address stride of the destination address, and the address stride of the source address in a case of the correspondence indicated by the first indication information. Optionally, the first parameter calculation rule is further used to indicate a value rule of the quantity of bodies in the SIMD instruction in a case of the correspondence indicated by the first indication information. In the body and tail technology, the tail in the SIMD instruction is used to resolve a problem of inexact division.

If there is inexact division, there is one tail; or if there is no inexact division, there is zero tail. Therefore, there is no value rule of the quantity of tails.

Further, in a case, if the body and tail technology is not used for the SIMD instruction of the target type, the quantity of bodies is set to one by default, and the quantity of tails is set to zero by default. An example is provided with reference to Formula (1), Formula (3), and Table 1. It is assumed that $stride_{i,k}=dstStride_{i,k}$, (i=0, 1, ..., I−1) and $stride_{j+I,k}=srcStride_{j,k}$, (j=0, 1, ..., J−1). In other words, $[stride_{l,k}]$, (l=0, 1, ..., I+J−1) is used to represent all stride (stride) parameters. It is assumed that $\sigma_k^i = a_k^i$, (i=0, 1, ..., I−1) and $\sigma_k^{I+j} = b_k^j$, (j=0, 1, ..., J−1). In other words, $[\sigma_k^l]$, (l=0, 1, ..., I+J−1) is used to represent coordinate linearization coefficients of all tensors, and it is ensured that variables l in $stride_{l,k}$ are in a one-to-one correspondence with variables l in $\sigma_k^l$. The first parameter calculation rule is presented in the following table.

In another case, the body and tail technology is used for the SIMD instruction of the target type, it is determined that the length of the first loop dimension and the constraint on the value of the first parameter corresponding to the first loop dimension cannot be exactly divided, and a tail needs to be set to resolve the inexact division in the body and tail technology. The first loop dimension is any of the N loop dimensions in the tensor formula. That the length of the first loop dimension is not exactly divided by the value range of the corresponding first parameter means that one or more first parameters in the SIMD instruction are used to calculate one first loop dimension, and the one or more first parameters include a fifth parameter and a sixth parameter, and the fifth parameter is ranked before the sixth parameter in the one or more first parameters. Therefore, that the length of the first loop dimension is not exactly divided by the value range of the corresponding first parameter means that the length of the first loop dimension is not exactly divided by a value

TABLE 2

| Value of N | Parameter repeat | Parameter stride |
|---|---|---|
| K | $repeat_k = E_k$<br>k = 0, 1, ..., K − 1 | $stride_k = \sigma_k$ |
| ... | ... | ... |
| K' | $repeat_{m_0^{k,s}} = \min(E_k, R_{m_0^{k,s}})$<br><br>$repeat_{m_\eta^{k,s}} = \min\left(\left\lfloor \dfrac{E_k}{\prod_{\zeta=0}^{\eta-1} repeat_{m_\zeta^{k,s}}} \right\rfloor, R_{m_\eta^{k,s}}\right)$<br><br>k = 0, 1, ..., K' − 1, s = 0, 1, ..., $C_{K-1}^{K'-1} - 1$<br>$m_\eta^{k,s} = \eta + \Sigma_{\zeta=0}^{k-1} M_\zeta^s (\eta = 0,1, ..., M_k^s - 1$ | $stride_{m_0^{k,s}} = \sigma_{m_0^{k,s}}$<br>$stride_{m_\eta^{k,s}} = repeat_{m_{\eta-1}^{k,s}} \times stride_{m_{\eta-1}^{k,s}}$ |
| ... | ... | ... |
| 1 | $repeat_0 = \min(E_0, R_0)$<br><br>$repeat_k = \min\left(\left\lfloor \dfrac{E_0}{\prod_{\zeta=0}^{k-1} repeat_\zeta} \right\rfloor, R_k\right)$<br><br>k = 0, 1, ..., K − 1 | $stride_0 = 1$<br>$stride_k = repeat_{k-1} \times stride_{k-1}$ |

Refer to Table 2. Meanings of all letters in Table 2 are described in Formula (1), Formula (3), and Table 1, and therefore, details are not described herein. If the K parameters $repeat_k$ in the SIMD instruction are used to represent one loop dimension $x_k$ in the tensor formula of the target operation type, the first parameter calculation rule may be represented as a row in which the value of N is 1 in Table 2. If the K parameters $repeat_k$ are used to represent K' loop dimensions, K' is an integer greater than 1 and less than K, and there are $C_{K-1}^{K'-1}$ correspondences between the K parameters $repeat_k$ and K' loop dimensions, in the $s^{th}$ ($(0 \leq s < C_{K-1}^{K'-1})$) correspondence in the foregoing $C_{K-1}^{K'-1}$ correspondences, the first parameter calculation rule may be expressed as a row in which the value of N is K' in Table 2. If the K parameters $repeat_k$ in the SIMD instruction are used to represent the K loop dimensions $x_k$ in the tensor formula of the target operation type, in other words, each dimension $repeat_k$ in the SIMD instruction is used to represent one loop dimension $x_k$ in the tensor formula of the target operation type, the first parameter calculation rule may be represented as a row in which the value of N is K in Table 2. It should be understood that the example in Table 2 is merely intended to facilitate understanding of a concept of the first parameter calculation rule, and is not intended to limit this solution.

range of the fifth parameter, or the length of the first loop dimension is not exactly divided by a value product of the fifth parameter and the sixth parameter. In an example, the SIMD instruction of the target type is used to implement an operation of two (namely, the value of N is 2) loop dimensions in the tensor formula. The first loop dimension is the $1^{st}$ loop dimension in the two loop dimensions. A length of the $1^{st}$ loop dimension is $E_0$, and the first parameter corresponding to the first loop dimension includes $repeat_0$, $repeat_1$, and $repeat_2$. It can be learned from the calculation rule in Table 2 that $repeat_0$ and $repeat_1$ in $repeat_0$, $repeat_1$, and $repeat_2$ need to be used to represent the $1^{st}$ loop dimension in the tensor formula. Therefore, that it is determined that the length of the first loop dimension and the value constraint of the first parameter corresponding to the first loop dimension cannot be exactly divided means that $E_2$ cannot be exactly divided by a product of $repeat_0$ and $repeat_1$. The tail is set to resolve the inexact division problem. The foregoing example is still used. If $E_2$ is not exactly divided by a product of $repeat_0$ and $repeat_1$, $E_2$ may be expressed by adding $repeat_0^{tail}$ to a result obtained after $repeat_0^{body}$ and $repeat_1^{body}$ are multiplied. In other words, in the body and tail technology, the tail is set to resolve the inexact division problem through addition. It should be understood that the foregoing example is merely for each of understanding of this solution, and is not intended to limit this solution. Correspondingly, the first parameter calculation rule may include Table 3 in addition to Table 2. Some parameter values obtained from Table 2 are adjusted in Table 3. The parameter calculation rule shown in Table 3 is used to generate a parameter value of a body part and a parameter value of a tail part of the SIMD instruction. In Table 3, examples are provided to explain meanings of various letters in Formula (1), Formula (3), Formula (5), Formula (6), Table 1, and Table 2.

TABLE 3

| Body part | $\text{repeat}^{body}_{m_\eta^{k,s}} = \text{floor}\left(\dfrac{E_k}{\prod_{\zeta=0}^{\eta-1} \text{repeat}_{m_\zeta^{k,s}}}\right)$ |
|---|---|
| | $B_{m_\eta^{k,s}} = 0$ |
| | $F^b_{m_\eta^{k,s}} = 1$ |
| | $Y^b_{M_k^s-1} = [0, F^b_{M_k^s-1}]$ |
| Tail part | $\text{repeat}^{tail}_{m_\eta^{k,s}} = \text{mod}\left(\dfrac{E_k}{\prod_{\zeta=0}^{\eta-1} \text{repeat}_{m_\zeta^{k,s}}}\right)$ |
| | $T_{m_\eta^{k,s}} = \text{repeat}^{body}_{m_\eta^{k,s}} \times \text{stride}_{m_\eta^{k,s}}$ |
| | $F^t_{m_\eta^{k,s}} = \begin{cases} 0, \text{ if } \text{repeat}^{tail}_{m_\eta^{k,s}} = 0 \\ 1, \text{ if } \text{repeat}^{tail}_{m_\eta^{k,s}} > 0 \end{cases}$ |
| | $Y^t_{M_k^s-1} = (0, F^t_{M_k^s-1}]$ |

The meanings of the letters in Table 3 are described in Formula (1), Formula (3), Formula (5), Formula (6), Table 1, and Table 2. Details are not described herein.

In another case, if the body and tail technology is used for the SIMD instruction of the target type, the constraint upper limit of the quantity of bodies in the SIMD instruction of the target type is $\overline{F_k^b}$ in the third parameter, when the length of the second loop dimension in the tensor formula exceeds an upper limit of a product of the $N^{th}$ body, both the body technology and the tail technology are used to extend an upper limit of a value of the $N^{th}$ body corresponding to the second loop dimension, and there is an inexact division problem between the length of the first loop dimension and the value constraint of the first parameter corresponding to the first loop dimension, the first parameter calculation rule may include Table 4 in addition to Table 2. Some parameter values obtained from Table 2 are adjusted in Table 4. A parameter calculation rule shown in Table 4 is used to generate a parameter value of the body part and a parameter value of the tail part in the SIMD instruction. In Table 4, examples are provided to explain meanings of various letters in Formula (1), Formula (3), Formula (5), Formula (6), Table 1, and Table 2.

TABLE 4

| Body part | $\text{repeat}^{body}_{M_k^s-1} = R_{M_k^s-1}$ |
|---|---|
| | $B_{M_k^s-1} = R_{M_k^s-1} \times \text{stride}_{M_k^s-1}$ |
| | $F_{M_k^s-1} = \text{floor}\left(\dfrac{E_k}{R_{M_k^s-1} \times \prod_{\zeta=0}^{M_k^s-2} \text{repeat}_{m_\zeta^{k,s}}}\right)$ |
| | $Y^b_{M_k^s-1} = [0, F^b_{M_k^s-1}]$ |

TABLE 4-continued

| Tail part | $\text{repeat}^{tail}_{M_k^s-1} = \text{mod}\left(\dfrac{E_k}{R_{M_k^s-1} \times \prod_{\zeta=0}^{M_k^s-2} \text{repeat}_{m_\zeta^{k,s}}}\right)$ |
|---|---|
| | $T_{M_k^s-1} = F_{M_k^s-1} \times \text{repeat}^{body}_{M_k^s-1} \times \text{stride}_{M_k^s-1}$ |
| | $F^t_{M_k^s-1} = \begin{cases} 0, \text{ if } \text{repeat}^{tail}_{M_k^s-1} = 0 \\ 1, \text{ if } \text{repeat}^{tail}_{M_k^s-1} > 0 \end{cases}$ |
| | $Y^t_{M_k^s-1} = (0, F^t_{M_k^s-1}]$ |

The meanings of the letters in Table 4 are described in Formula (1), Formula (3), Formula (5), Formula (6), Table 1, and Table 2. Details are not described herein.

Operation 304: The SIMD instruction processing apparatus obtains a cost function corresponding to the first SIMD instruction model.

In some embodiments of this application, the SIMD instruction processing apparatus obtains a cost function corresponding to the information about a first SIMD instruction model. The cost function is used to select an optimal SIMD instruction when the SIMD instruction generation apparatus performs an SIMD instruction conversion operation on the tensor formula of the target operation type. The cost function may correspond to one or more optimization objectives (namely, a dependent variable of the cost function). The optimization objective include but is not limited to a smallest quantity of execution times of an SIMD instruction, a largest quantity of execution times of an SIMD instruction, a smallest quantity of bodies and tails in an SIMD instruction, a largest quantity of bodies and tails in an SIMD instruction, a longest interval between a body and a tail in an SIMD instruction, a shortest interval between a body and a tail in an SIMD instruction, a shortest scheduling delay of an SIMD instruction, a longest scheduling delay of an SIMD instruction, shortest total execution duration of an SIMD instruction, a highest calculation overhead of an address stride in an SIMD instruction, a lowest calculation overhead of an address stride in an SIMD instruction, a largest value of a first parameter of a specific dimension or several specific dimensions in K first parameters of an SIMD instruction, a smallest value of a first parameter of a specific dimension or several specific dimensions in K first parameters of an SIMD instruction, $\text{dstStride}_{i,k}$ has a smallest parameter value when a specific value or several specific values are selected as i, $\text{dstStride}_{i,k}$ has a largest parameter value when a specific value or several specific values are selected as i, $\text{srcStride}_{j,k}$ has a smallest parameter value when a specific value or several specific values are selected as j and/or $\text{srcStride}_{j,k}$ has a smallest parameter value when a specific value or several specific values are selected as j, and the like. It should be understood that the foregoing example of the optimization objective is for each of understanding of this solution. In an actual case, there may be another type of optimization objective. Specifically, the specific optimization objective may be determined with reference to a factor such as hardware performance of the chip. In this embodiment of this application, a plurality of cases of the optimization objective are provided, and an application scenario of this solution is extended.

An independent variable of the cost function includes at least one of the following: a parameter value of the first parameter in the first SIMD instruction, a quantity of bodies in the first SIMD instruction, a quantity of tails in the first SIMD instruction, a quantity of times of calculating an address stride in the first SIMD instruction, duration of executing one SIMD instruction, duration of switching from a process of executing one first SIMD instruction to a process of executing another first SIMD instruction, and duration of executing different parameters repeat in the SIMD instruction by the chip. Further, a parameter value of a first parameter in an SIMD instruction may include a parameter value of a first parameter in a body part of the SIMD instruction and a parameter value of a first parameter in a tail part of the SIMD instruction, and the quantity of bodies in the SIMD instruction may include a quantity of bodies of each type in N types of bodies in the body part of the SIMD instruction. In this embodiment of this application, the cost function is generated in advance, to assist in selecting the optimal SIMD instruction when executing an SIMD instruction conversion stage of the tensor formula of the target operation type. The cost function is generated based on the optimization objective, and may meet an SIMD instruction optimization requirement of a user. The SIMD instruction cost function considers both an SIMD instruction parameter and a hardware parameter of a chip, so that a generated optimal SIMD instruction can more fully use performance of the chip.

Specifically, in an implementation, operation 304 may include: The SIMD instruction processing apparatus may receive a cost function that corresponds to the information about a first SIMD instruction model and that is entered by a person skilled in the art. In other words, after learning of the optimization objective of the user, the person skilled in the art may manually generate the cost function corresponding to the information about a first SIMD instruction model, and then enter the cost function into the SIMD instruction processing apparatus. Further, an input box of the cost function may be provided in a presentation interface of the SIMD instruction processing apparatus, to receive the cost function entered by the user through the input box. The SIMD instruction processing apparatus may alternatively receive a file including the cost function, and the file includes but is not limited to a text document, a table, and a coded file.

In another implementation, operation 304 may include: The SIMD instruction processing apparatus may receive an optimization objective entered by the person skilled in the art, and generate, based on the optimization objective and the SIMD instruction model of the target type, the cost function corresponding to the information about a first SIMD instruction model. A specific implementation in which the SIMD instruction processing apparatus receives the optimization objective is similar to a specific implementation in which the SIMD instruction processing apparatus receives the cost function. Details are not described herein.

It should be noted that an execution sequence of operation 303 and operation 304 is not limited in this embodiment of this application. Operation 303 may be performed before operation 304, or operation 304 may be performed before operation 303.

Operation 305: The SIMD instruction processing apparatus outputs the information about a first SIMD instruction model.

In this embodiment of this application, the chip may include one or more types of SIMD instructions, after the SIMD instruction processing apparatus performs operations 301 to 304 once, the SIMD instruction processing apparatus may generate information that is about a first SIMD instruction model and that corresponds to one type of SIMD instruction (namely, one set of SIMD instruction models), a first parameter calculation rule, and a cost function. Therefore, after the SIMD instruction processing apparatus performs operations 301 to 304 once for each of the one or more types of SIMD instructions of the chip, the SIMD instruction processing apparatus may obtain one or more types of information that are about a first SIMD instruction model and that correspond to one or more types of SIMD instructions, a first parameter calculation rule, and a cost function, and then may perform an output operation.

Specifically, operations 303 and 304 are optional operations. If operations 303 and 304 are performed, operation 305 may include: The SIMD instruction processing apparatus outputs the first indication information, the first constraint condition, the first parameter calculation rule, and the cost function. If only operation 304 is performed and operation 303 is not performed, operation 305 may include: The SIMD instruction processing apparatus outputs the first indication information, the first constraint condition, and the cost function. If only operation 303 is performed and operation 304 is not performed, operation 305 may include: The SIMD instruction processing apparatus outputs the first indication information, the first constraint condition, and the first parameter calculation rule.

More specifically, for a manner of outputting the information about a first SIMD instruction model, the first parameter calculation rule, and/or the cost function, the SIMD instruction processing apparatus may directly present the information about a first SIMD instruction model, the first parameter calculation rule, and/or the cost function in the presentation interface, and then the person skilled in the art configures the information about a first SIMD instruction model, the first parameter calculation rule, and/or the cost function in the SIMD instruction generation apparatus. Alternatively, the SIMD instruction processing apparatus may package the information about a first SIMD instruction model, the first parameter calculation rule, and/or the cost function into a file, and output the file, and further, the person skilled in the art configures the information about a first SIMD instruction model, the first parameter calculation rule, and/or the cost function into the SIMD instruction generation apparatus. Alternatively, the SIMD instruction processing apparatus may directly send the information about a first SIMD instruction model, the first parameter calculation rule, and/or the cost function to the SIMD instruction generation apparatus through a wireless network or a wired network. An output manner of the SIMD instruction processing apparatus is not limited herein.

In this embodiment of this application, a generated set that is of information about an SIMD instruction model and that corresponds to the chip is used to indicate to perform an SIMD instruction conversion operation on a tensor formula. In addition, the plurality of groups of information about a first SIMD instruction model are generated in advance, and a matched combination is first selected from several combinations based on lengths of N loop dimensions of the tensor formula in a conversion process, to greatly reduce difficulty in an SIMD instruction generation process, and improve automatic SIMD instruction generation efficiency.

II. Conversion Stage of a Tensor Formula

Figure 5A:
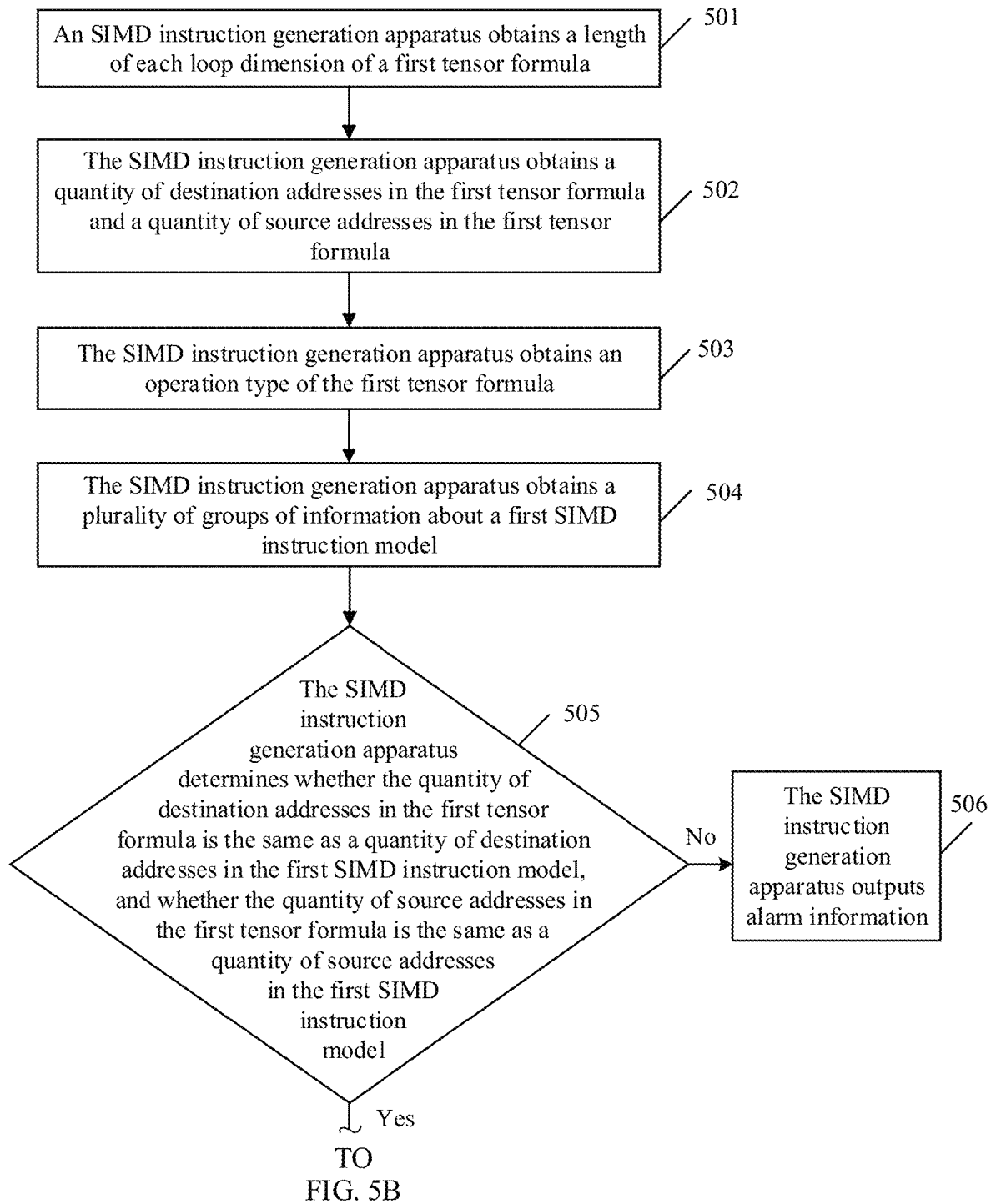
FIG. 5A and FIG. 5B are a schematic flowchart of an SIMD instruction generation method according to an embodiment of this application.
Figure 5B:
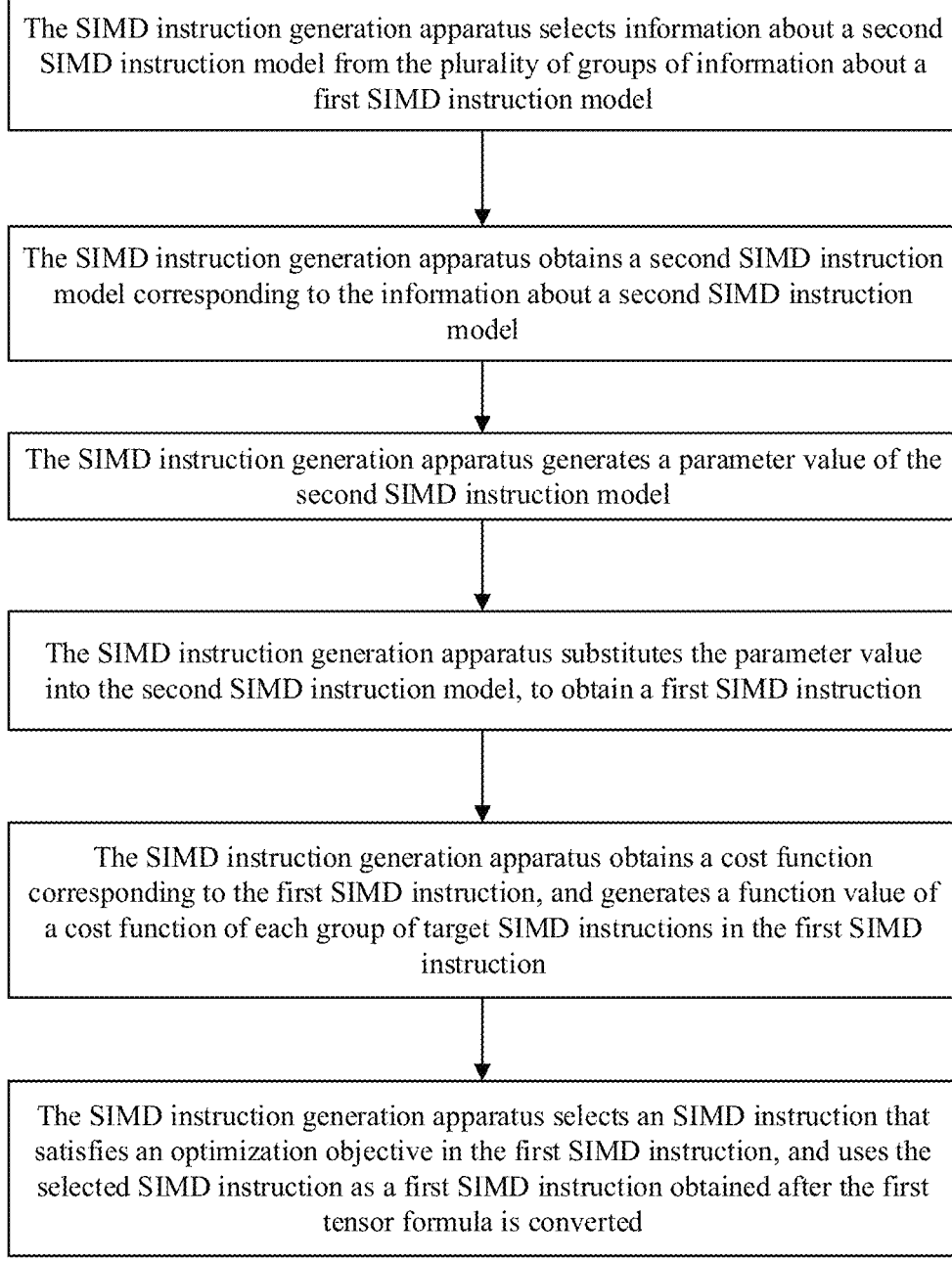

In an embodiment of this application, FIG. 5A and FIG. 5B are a schematic flowchart of an SIMD instruction generation method according to an embodiment of this application. The single instruction multiple data SIMD instruction processing method provided in this embodiment of this application may include the following operations.

Operation 501: The SIMD instruction generation apparatus obtains a length of each loop dimension of a first tensor formula.

In this embodiment of this application, the SIMD instruction generation apparatus may obtain lengths of H loop dimensions in the first tensor formula after obtaining the first tensor formula in a process of converting the tensor formula into an SIMD instruction. The first tensor formula includes a total of H loop dimensions. For a concept of the tensor formula, a concept of the loop dimension, and a concept of the length of the loop dimension in the tensor formula, refer to the description in operation 201 in the embodiment corresponding to FIG. 3. Details are not described herein.

Operation 502: The SIMD instruction generation apparatus obtains a quantity of destination addresses in the first tensor formula and a quantity of source addresses in the first tensor formula.

In some embodiments of this application, after obtaining the first tensor formula, the SIMD instruction generation apparatus may further obtain the quantity of destination addresses in the first tensor formula and the quantity of source addresses in the first tensor formula. For a concept of the quantity of destination addresses in the first tensor formula and a concept of the quantity of source addresses in the first tensor formula, refer to the description in operation 201 in the embodiment corresponding to FIG. 3. Details are not described herein.

Operation 503: The SIMD instruction generation apparatus obtains an operation type of the first tensor formula.

In some embodiments of this application, after obtaining the first tensor formula, the SIMD instruction generation apparatus may further obtain the operation type of the first tensor formula. For a concept of the operation type of the first tensor formula, refer to the description in operation 201 in the embodiment corresponding to FIG. 3. Details are not described herein.

It should be noted that an execution sequence of operation 501, operation 502, and operation 503 is not limited in this embodiment of this application. Operation 501, operation 502, and operation 503 may be simultaneously performed, or operation 501, operation 502, and operation 503 may be performed in any sequence.

Operation 504: The SIMD instruction generation apparatus obtains a plurality of groups of information about a first SIMD instruction model.

In this embodiment of this application, operation 503 is an optional operation. If operation 503 is performed, operation 504 may include: The SIMD instruction generation apparatus obtains the plurality of groups of information about a first SIMD instruction model from a set of information about an SIMD instruction model. Specifically, the SIMD instruction generation apparatus may preconfigure the set of information about an SIMD instruction model, the set of information about an SIMD instruction model may include at least one subset of information about an SIMD instruction model, each subset of information about an SIMD instruction model corresponds to a tensor formula of one operation type, different subsets of information about an SIMD instruction model correspond to tensor formulas of different operation types, and a subset that is of information about an SIMD instruction model and to which at least one group of information about a first SIMD instruction model belongs corresponds to an operation type of the first tensor formula. After obtaining the operation type of the first tensor formula, the SIMD instruction generation apparatus may obtain, from the set of information about an SIMD instruction model, information that is about a first SIMD instruction model and that matches the operation type of the first tensor formula. The operation type of the first tensor formula may be addition, multiplication, or another operation type. In this embodiment of this application, the information about a first SIMD instruction model is generated for a tensor formula of a specific operation type. In other words, tensor formulas of different operation types correspond to different information about an SIMD instruction model. Therefore, there is a higher degree at which the information about a first SIMD instruction model fits a tensor formula of the operation type of the first tensor formula, and efficiency of an SIMD instruction generation process is improved.

If operation 503 is not performed, an execution sequence of operations 501 and 502 and operation 504 is not limited in this embodiment of this application. Operations 501 and 502 may be performed before operation 504; or operation 504 may be performed before operations 501 and 502. Operation 504 may include: The SIMD instruction generation apparatus obtains the plurality of groups of information about a first SIMD instruction model from a storage medium, and determines all information about a first SIMD instruction model in the plurality of groups of information about a first SIMD instruction model as the information about a first SIMD instruction model.

Operation 505: The SIMD instruction generation apparatus determines whether the quantity of destination addresses in the first tensor formula is the same as a quantity of destination addresses in the first SIMD instruction model, and whether the quantity of source addresses in the first tensor formula is the same as a quantity of source addresses in the first SIMD instruction model; and performs operation 506 if the quantity of destination addresses in the first tensor formula is not the same as a quantity of destination addresses in the first SIMD instruction model, and the quantity of source addresses in the first tensor formula is not the same as a quantity of source addresses in the first SIMD instruction model; or performs operation 507 if the quantity of destination addresses in the first tensor formula is the same as a quantity of destination addresses in the first SIMD instruction model, and the quantity of source addresses in the first tensor formula is the same as a quantity of source addresses in the first SIMD instruction model.

In some embodiments of this application, the information about a first SIMD instruction model may further include a second constraint condition, and the second constraint condition is used to indicate a quantity of destination addresses in a tensor formula matching the information about a first SIMD instruction model and a quantity of source addresses in the tensor formula matching the information about a first SIMD instruction model. The SIMD instruction generation apparatus may perform a determining operation after obtaining the quantity of destination addresses and the quantity of source addresses in the first tensor formula in operation 502 and obtaining the second constraint condition from the information about a first SIMD instruction model.

Operation 506: The SIMD instruction generation apparatus outputs alarm information.

In some embodiments of this application, when the quantity of destination addresses in the first tensor formula is different from the quantity of destination addresses in the first SIMD instruction model, or the quantity of source addresses in the first tensor formula is different from the quantity of source addresses in the first SIMD instruction model, the SIMD instruction generation apparatus outputs the alarm information. The alarm information is used to notify the user that an SIMD instruction automatic conversion process fails. Specifically, the alarm information may be output in a form of a text box; may be output in a form of voice; may be output in a form of a flashing signal light, or the like. An output manner of the alarm information is not limited this time.

Operation 507: The SIMD instruction generation apparatus selects information about a second SIMD instruction model from the plurality of groups of information about a first SIMD instruction model.

In this embodiment of this application, operations 502, 505 and 506 each are an optional operation. If operation 502 is not performed, operations 505 and 506 do not need to be performed, and operation 507 may be directly performed after operation 504 is performed. If operation 502 is performed, operations 505 and 506 need to be performed. Operation 507 may include: When the quantity of destination addresses in the first tensor formula and the quantity of source addresses in the first tensor formula meet a constraint of the second constraint condition, the SIMD instruction generation apparatus selects, from the information about a first SIMD instruction model based on the lengths of the H loop dimensions in the first tensor formula, information that is about a second SIMD instruction model and that matches the first tensor formula. In this embodiment of this application, in a process of performing an automatic SIMD instruction conversion operation, whether the quantity of destination addresses and the quantity of source addresses in the first tensor formula meet a requirement for a quantity of destination addresses and a quantity of source addresses in an SIMD instruction model is first determined. Only when a constraint is satisfied, a subsequent SIMD instruction model matching operation is performed. In addition, if the requirement is not met, the alarm information is output in a timely manner, to improve efficiency of an automatic SIMD instruction conversion process.

Specifically, refer to the description in operation 202 in the embodiment corresponding to FIG. 3. The information about a first SIMD instruction model includes a plurality of groups of information about a first SIMD instruction model, each group of information about an SIMD instruction model includes first indication information and a first constraint condition, the first constraint condition is used to indicate a constraint condition of lengths of N loop dimensions in a tensor formula matching the information about a first SIMD instruction model in a case of a correspondence indicated by the first indication information, and N is an integer greater than or equal to 1 and less than or equal to H. After obtaining the information about a first SIMD instruction model, the SIMD instruction generation apparatus obtains a plurality of first constraint conditions from the information about a first SIMD instruction model. For a specific presentation form, refer to Table 1. After obtaining the lengths of the H loop dimensions, the SIMD instruction generation apparatus performs matching on a plurality of first constraint conditions based on the lengths of the H loop dimensions, to obtain at least one first constraint condition matching the first tensor formula. In an example, $E_0$ is obtained from the lengths of the H loop dimensions, and whether $E_0$ satisfies a formula $E_0 \leq \Pi_{j=0}^{K-1} R_j$ is determined. In another example, if a value of N is K', k is any integer from zero to K'−1, $E_0, E_1, \ldots,$ and $E_{K'}$ are obtained from the lengths of the H loop dimensions, and whether $E_0, E_1, \ldots,$ and $E_{K'}$ meet a corresponding first constraint condition is further separately determined. Another example is not provided herein again. After the at least one first constraint condition matching the first tensor formula is selected from the information about a first SIMD instruction model based on the lengths of the H loop dimensions, at least one piece of first indication information that is in a one-to-one correspondence with the matched at least one first constraint condition is obtained. In other words, information that is about a second SIMD instruction model and that matches the first tensor formula is selected. The information about a second SIMD instruction model includes at least one group of information about a first SIMD instruction model.

More specifically, in a possible implementation, the at least one group of information about a first SIMD instruction model includes information about a third SIMD instruction model, information about a fourth SIMD instruction model, and information about a fifth SIMD instruction model, a value of N corresponding to the information about a third SIMD instruction model is less than a value of N corresponding to the information about a fourth SIMD instruction model, the value of N corresponding to the information about a fourth SIMD instruction model is less than a value of N corresponding to the information about a fifth SIMD instruction model, and N corresponding to the information about a fourth SIMD instruction model is greater than or equal to 2. Operation 507 may include: The SIMD instruction generation apparatus selects the information about a second SIMD instruction model from the information about a third SIMD instruction model; and if the information about a second SIMD instruction model does not exist in the information about a fourth SIMD instruction model, terminates selecting the information about a second SIMD instruction model from the information about a fifth SIMD instruction model. Further, the SIMD instruction generation apparatus selects the information about a second SIMD instruction model from the information about a third SIMD instruction model, and then selects the information about a second SIMD instruction model from the information about a fourth SIMD instruction model. In this embodiment of this application, if a matched model does not exist in a low dimensional model, matching does not need to be performed on a high dimensional model, to effectively reduce a quantity of matching times, and further improve SIMD instruction generation efficiency.

In another implementation, the SIMD instruction generation apparatus may perform matching on each of the plurality of first constraint conditions based on the lengths of the H loop dimensions in a random match manner, to obtain at least one first constraint condition matching the first tensor formula.

Operation 508: The SIMD instruction generation apparatus obtains a second SIMD instruction model corresponding to the information about a second SIMD instruction model.

In this embodiment of this application, after the SIMD instruction generation apparatus obtains the information about a second SIMD instruction model, because the information about a second SIMD instruction model includes at least one group of information about a first SIMD instruction model, each group of information about a first SIMD instruction model corresponds to one first SIMD instruction model. The SIMD instruction generation apparatus obtains a second SIMD instruction model corresponding to the information about a second SIMD instruction model. The second SIMD instruction model includes at least one first SIMD instruction model. Specifically, in an implementation, the information about a first SIMD instruction model may not include the first SIMD instruction model, and the SIMD instruction generation apparatus generates the second SIMD instruction model based on an instruction format of an SIMD instruction of a target type in a chip and at least one piece of first indication information included in the information about a second SIMD instruction model. In another implementation, each group of information about a first SIMD instruction model further includes a first SIMD instruction model. Therefore, after the information about a second SIMD instruction model is obtained, the at least one first SIMD instruction model is obtained from the at least one group of information that is about a first SIMD instruction model and that is included in the information about a second SIMD instruction model, and all the obtained first SIMD instruction models are determined as the second SIMD instruction models.

Operation 509: The SIMD instruction generation apparatus generates a parameter value of the second SIMD instruction model.

In this embodiment of this application, the SIMD instruction generation apparatus may generate the parameter value of the second SIMD instruction model based on the lengths of the N loop dimensions in the first tensor formula, the first indication information included in the information about a second SIMD instruction model, the first constraint condition included in the information about a second SIMD instruction model, and a coordinate linearization coefficient of the first tensor formula. The generated parameter value includes a parameter value of K first parameters, a parameter value of a destination address stride, and a parameter value of a source address stride. Optionally, the generated parameter value may further include a quantity of bodies and a quantity of tails.

Specifically, a first parameter calculation rule may be preconfigured in the SIMD instruction generation apparatus, so that after obtaining the lengths of the N loop dimensions in the first tensor formula, the coordinate linearization coefficient of the first tensor formula, and the second SIMD instruction model, the SIMD instruction generation apparatus generates a model parameter of each SIMD instruction model included in the second SIMD instruction model according to the preconfigured first parameter calculation rule. The SIMD instruction generation apparatus may alternatively generate the first parameter calculation rule after obtaining the lengths of the N loop dimensions of the first tensor formula, the coordinate linearization coefficient of the first tensor formula, and the second SIMD instruction model, and further generate, based on the generated first parameter calculation rule, a model parameter of each SIMD instruction model included in the second SIMD instruction model.

More specifically, in a case, if the body and tail technologies are not used for the SIMD instruction of the target type, for a specific expression form of the first parameter calculation rule, refer to Table 2 in the embodiment corresponding to FIG. 3. The SIMD instruction generation apparatus substitutes the obtained lengths of the N loop dimensions of the first tensor formula and the coordinate linearization coefficient of the first tensor formula into the parameter calculation rule shown in Table 2, to obtain the model parameter of each SIMD instruction model included in the second SIMD instruction model.

In another case, the body and tail technologies are used for the SIMD instruction of the target type, and operation 509 may include: The SIMD instruction generation apparatus obtains, based on the first indication information in the information about a second SIMD instruction model, a first parameter corresponding to a first loop dimension in the first tensor formula. The first loop dimension is one of at least one loop dimension, and a length of the first loop dimension is not exactly divided by a value range of the corresponding first parameter. The SIMD instruction generation apparatus generates a parameter value of a body part of the first SIMD instruction and a parameter value of a tail part of the first SIMD instruction based on the length of the first loop dimension. Because it is determined that there is inexact division in terms of the length of the first loop dimension and a constraint on a value of the first parameter corresponding to the first loop dimension determine, and a manner in which the tail is set to resolve the inexact division is described in the embodiment corresponding to FIG. 3. Details are not described herein. In this embodiment of this application, a problem of inexact division between a loop dimension and the first parameter is resolved by using the body and tail technologies, to extend an applicable case of this solution, and extend an applicable application scope of this solution.

Specifically, for a parameter value generation process of any SIMD instruction model in the second SIMD instruction model, the SIMD instruction generation apparatus may first perform a model parameter generation operation of the SIMD instruction model according to the parameter calculation rule shown in Table 2. In a generation process, whether there is a problem of inexact division in terms of the length of the first loop dimension and the constraint of the value of the first parameter corresponding to the first loop dimension may be determined. If there is a problem of inexact division, the SIMD instruction generation apparatus further sets a tail part of the SIMD, adjusts a partial parameter value of the body part of the SIMD instruction according to the parameter calculation rule shown in Table 3, and generates a parameter value of the tail part of the SIMD instruction.

In another case, the body and tail technologies are used for the SIMD instruction of the target type, and operation 509 may include: The SIMD instruction generation apparatus obtains, based on the first indication information in the information about a second SIMD instruction model, a first parameter corresponding to a second loop dimension in the first tensor formula. The second loop dimension is a highest loop dimension in at least one loop dimension, and a length of the second loop dimension exceeds an upper limit of a value of the corresponding first parameter. The SIMD instruction generation apparatus generates a parameter value of a body part of the first SIMD instruction based on the length of the second loop dimension. In this embodiment of this application, a problem that a length of the $N^{th}$ loop dimension is greater than an upper limit of a value of the first parameter corresponding to the second loop dimension is resolved by using the body and tail technologies, to further extend an applicable case of this solution, and further extend an applicable range of this solution.

Specifically, for a parameter value generation process of any SIMD instruction model in the second SIMD instruction model, the SIMD instruction generation apparatus may first perform a model parameter generation operation of the SIMD instruction model according to the parameter calculation rule shown in Table 2. In a generation process, whether the length of the $N^{th}$ loop dimension is greater than the upper limit of the value of the first parameter corresponding to the second loop dimension may be determined, and when it is determined that the length of the $N^{th}$ loop dimension exceeds the upper limit of the value of the first parameter corresponding to the second loop dimension, a partial parameter value of the body part of the SIMD instruction is adjusted according to the parameter calculation rule shown in Table 4.

In another case, the body and tail technologies are used for the SIMD instruction of the target type, and operation 509 may include: The SIMD instruction generation apparatus obtains, based on the first indication information included in the information about a second SIMD instruction model, a constraint on a value of a first parameter corresponding to a first loop dimension in the first tensor formula. A parameter value of a body part of the target SIMD instruction and a parameter value of a tail part of the target SIMD instruction are generated when the length of the $N^{th}$ loop dimension is greater than the upper limit of the value of the first parameter corresponding to the second loop dimension and it is determined, based on the length of the first loop dimension and the constraint on the value of the first parameter corresponding to the first loop dimension, that there is inexact division.

Specifically, for a parameter value generation process of any SIMD instruction model in the second SIMD instruction model, the SIMD instruction generation apparatus may first perform a model parameter generation operation of the SIMD instruction model according to the parameter calculation rule shown in Table 2. In a generation process, whether the length of the $N^{th}$ loop dimension is greater than the upper limit of the value of the first parameter corresponding to the second loop dimension may be determined, and whether there is a problem of inexact division in terms of the length of the first loop dimension and the constraint of the value of the first parameter corresponding to the first loop dimension is determined. When it is determined that the length of the $N^{th}$ loop dimension exceeds the upper limit of the value, and there is inexact division, a partial parameter value of the body part of the SIMD instruction is adjusted according to the parameter calculation rule shown in Table 4, and a parameter value of the tail part of the SIMD instruction is generated.

Operation 510: The SIMD instruction generation apparatus substitutes the parameter value into the second SIMD instruction model, to obtain the first SIMD instruction.

In this embodiment of this application, the SIMD instruction generation apparatus separately substitutes the parameter value into each second SIMD instruction model included in the at least one second SIMD instruction model, to obtain one or more first SIMD instructions. A quantity of SIMD instructions in the first SIMD instruction is the same as a quantity of second SIMD instruction models.

Operation 511: The SIMD instruction generation apparatus obtains a cost function corresponding to the first SIMD instruction, and generates a function value of a cost function of each group of target SIMD instructions in the first SIMD instruction.

In this embodiment of this application, a plurality of cost functions corresponding to a plurality of types of SIMD instructions in the chip may be preconfigured in the SIMD instruction generation apparatus, and the cost function corresponding to the first SIMD instruction in the chip is obtained. In other words, a cost function corresponding to a target type of SIMD instruction in the chip is obtained. The cost function indicates an optimization objective related to the first SIMD instruction. The SIMD instruction generation apparatus generates a function value of a cost function of each of the one or more first SIMD instructions based on the parameter value of the target SIMD instruction and a hardware performance parameter of the chip. Optionally, the function value of the cost function of each of a plurality of first SIMD instructions may be generated only when the plurality of first SIMD instructions are obtained in operation 510. For detailed description of the cost function, refer to operation 204 in the embodiment corresponding to FIG. 3. Details are not described herein again.

Operation 512: The SIMD instruction generation apparatus selects an SIMD instruction that satisfies the optimization objective in the first SIMD instruction, and uses the selected SIMD instruction as the first SIMD instruction obtained after the first tensor formula is converted.

In this embodiment of this application, after obtaining the function value of the cost function of each of the one or more first SIMD instructions, the SIMD instruction generation apparatus selects an SIMD instruction with a largest function value from the one or more first SIMD instructions, and uses the selected SIMD instruction as a first SIMD instruction obtained after the first tensor formula is converted; or selects an SIMD instruction with a smallest function value from the one or more first SIMD instructions, and uses the selected SIMD instruction as the first SIMD instruction obtained after the first tensor formula is converted. In this embodiment of this application, the cost function is used to select an optimal SIMD instruction, to help improve performance of an SIMD instruction execution process.

In this embodiment of this application, a specific implementation solution of converting the first tensor formula into an SIMD instruction is implemented. The plurality of groups of information about a first SIMD instruction model are generated in advance, and a matched second SIMD instruction model is first selected from several groups of information about a first SIMD instruction model based on the length of each loop dimension of the tensor formula in a conversion process, to greatly improve efficiency of an SIMD instruction generation process.

Figure 6:
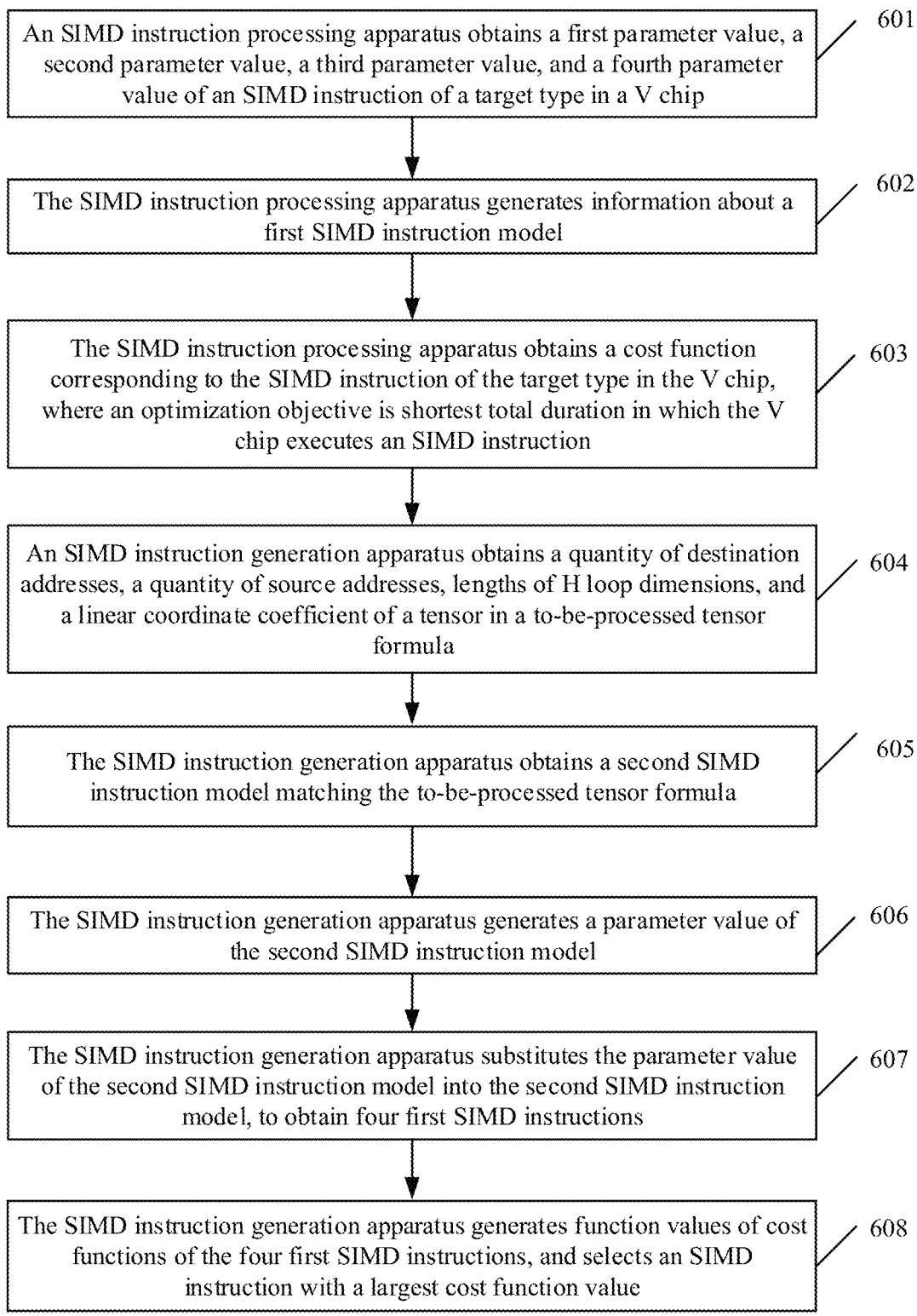
FIG. 6 is still another schematic flowchart of an SIMD instruction processing method according to an embodiment of this application.

To further understand this solution, refer to FIG. 6. FIG. 6 is a schematic flowchart of an SIMD instruction processing method according to an embodiment of this application. In FIG. 6, that a destination chip is a V chip is used as an example. An optimization objective proposed by a user is that there is shortest total duration in which the V chip executes an SIMD instruction. A quantity of bodies of the SIMD instruction cannot exceed five, and a quantity of tails cannot exceed one. An entered tensor formula is as follows:

```
for (x5, 0, 2) {                                          (7)
    for (x0, 0, 16) {
        for (x4, 0, 3) {
            for (x3, 0, 4) {
                for (x2, 0, 6) {
                    for (x1, 0, 4) {
                        D₀ [((((((x5*58656) + (x4*19536)) + (x3*4880)) +
(x2*304)) + (x1*48)) + x0) + 0)]
                         = S₀[((((((x5*34736) + (x4*17344)) + (x3*5776)) +
(x2*912)) + (x1*48)) + x0) + 0)]
                         + S₁[((((((x5*5568) + (x4*0)) + (x3*0)) + (x2*912))
+
                         (x1*0)) + x0) + 0)]
                    }
                }
            }
        }
    }
}
```

Under limitation of the foregoing condition, the SIMD instruction processing method provided in this embodiment of this application may include:

Operation 601: An SIMD instruction processing apparatus obtains a first parameter value, a second parameter value, a third parameter value, and a fourth parameter value of an SIMD instruction of a target type in a V chip.

In this embodiment, referring to Formula (7), it can be learned that the SIMD instruction of the target type is used to implement a tensor formula whose operation type is addition. A person skilled in the art may refer to an ISA of the V chip, to obtain a format of an SIMD instruction processing apparatus that is the target type and that is configured to implement the tensor formula whose operation type is addition in the V chip:

$$V\_SIMD\_OP(dst_0, src_0, src_1, repeat_1, repeat_2, \\ dstStride_{0,1}, srcStride_{0,1}, srcStride_{1,1}, dstStride_{0,2}, \\ srcStride_{0,2}, srcStride_{1,2}) \quad (8)$$

A person skilled in the art may learn that the first parameter value (namely, K) is 3, the second parameter value includes $R_0$, $R_1$, and $R_2$, a value of $R_2$ is 16, a value of $R_1$ is 8, and a value of $R_2$ is 4. Due to a hardware performance requirement of the V chip, a fixed value of $repeat_0$ is 16, and fixed values of $dstStride_{i,0}$ and $srcStride_{j,0}$ each are 1. An upper limit of a quantity that is of bodies and that is included in the third parameter value is 5, a quantity that is of destination addresses (namely, I) and that is included in the fourth parameter value is 1, and a quantity that is of source addresses (namely, J) and that is included in the fourth parameter value is 2. After learning of the foregoing information, the person skilled in the art enters the first parameter value, the second parameter value, the third parameter value, the fourth parameter value, and values of $repeat_0$, $dstStride_{i,0}$, and $srcStride_{j,0}$ into the SIMD instruction processing apparatus through a presentation interface of the SIMD instruction apparatus. Correspondingly, the SIMD instruction processing apparatus obtains the foregoing information.

Operation 602: The SIMD instruction processing apparatus generates information about a first SIMD instruction model.

In this embodiment, after learning that there are three first parameters in the SIMD instruction apparatus, the SIMD instruction processing apparatus may generate the information about a first SIMD instruction model. The information about a first SIMD instruction model includes four groups of information about a first SIMD instruction model, and each group of information about an SIMD instruction model includes one piece of first indication information and one first constraint condition.

Specifically, the four pieces of first indication information are respectively: (1) If the SIMD instruction of the target type is used to implement one loop dimension in a tensor formula, the three first parameters jointly correspond to one loop dimension in the tensor formula; (2) If the SIMD instruction of the target type is used to implement two loop dimensions in a tensor formula, the $1^{st}$ two first parameters in the three first parameters may correspond to one loop dimension in the tensor formula, and the last one first parameter may correspond to one loop dimension in the tensor formula; (3) If the SIMD instruction of the target type is used to implement two loop dimensions in a tensor formula, the $1^{st}$ first parameter in the three first parameters may correspond to one loop dimension in the tensor formula, and the last two first parameters correspond to one loop dimension in the tensor formula; and (4) If the SIMD instruction of the target type is used to implement three loop dimensions in a tensor formula, the three first parameters respectively correspond to three loop dimensions in the tensor formula.

Correspondingly, the four pieces of first indication information respectively correspond to four first constraint conditions. Refer to Table 5. Letters in Table 5 are descriptions in the embodiment corresponding to FIG. 3.

TABLE 5

| Value of N | First constraint condition | First indication information |
|---|---|---|
| 3 | $E_0 = 16$, $E_1 \leq 8$, $E_2 \leq 4 \times 5$ | (4) |
| 2 Submodel 0 | $E_0 = 16$, $E_1 \leq 8 \times 4 \times 5$ | (3) |
| Submodel 1 | $E_0 \leq 16 \times 4$, $E_1 \leq 8 \times 5$ | (2) |
| 1 | $E_0 \leq 16 \times 8 \times 4 \times 5$ | (1) |

Operation 603: The SIMD instruction processing apparatus obtains a cost function corresponding to the SIMD instruction of the target type in the V chip, where an optimization objective is shortest total duration in which the V chip executes an SIMD instruction.

In this embodiment, after the person skilled in the art learns that the optimization objective set by the user for the V chip is the shortest total execution duration of an SIMD instruction, when it is determined, based on a unified model of the cost function of the SIMD instruction of the target type in the V chip, that the optimization objective is the shortest total execution duration of an SIMD instruction, the cost function of the SIMD instruction of the target type in the V chip is obtained and entered into the SIMD instruction processing apparatus. Correspondingly, the SIMD instruction processing apparatus receives the cost function that corresponds to the SIMD instruction of the target type in the V chip and that is entered by the person skilled in the art.

With reference to definitions of meanings of various letters in the embodiment corresponding to FIG. 3, the unified model of the cost function of the SIMD instruction of the target type in the V chip may be as follows:

$$G(repeat_1^{body}, repeat_2^{body}, repeat_1^{tail}, repeat_2^{tail}, F_1^b, F_2^b, \\ F_1^t, F_2^t, c_t, c_v, c_r^1) \quad (9)$$

Herein, $F_1^b$ represents a quantity of $repeat_1^{body}$, $F_2^b$ represents a quantity of $repeat_2^{body}$, $F_1^t$ represents a quantity of $repeat_1^{tail}$, $F_2^t$ represents a quantity of $repeat_2^{tail}$ $c_t$ represents switching time consumption of processing the body part of the SIMD instruction and the tail part of the SIMD instruction by hardware of the V chip, $c_v$ represents time consumption of invoking one SIMD instruction by hardware of the V chip, and $c_r^1$ represents time consumption of executing different repeat parameters of the SIMD instruction by hardware of the V chip.

With reference to the definition of the meanings of various letters in the embodiment corresponding to FIG. 3, when the optimization objective is the shortest total execution duration of an SIMD instruction, the cost function of the SIMD instruction of the target type in the V chip may be:

$$G = \frac{\prod_{l=0}^{min(H-1,2)} E_1}{\prod_{l=0}^{min(H-1,2)} E_1 + c_t \times (F_1^t + F_2^t) + c_v \times \prod_{l=k}^{min(H-1,2)} E_1 + \prod_{l=0}^{2} c_r^1 \times repeat_1} \quad (10)$$

Herein, H represents a quantity of dimensions in the tensor formula, $E_l$ represents a length of the $l^{th}$ loop dimension in the tensor formula, and a meaning of another letter in Formula (10) is described in the embodiment in FIG. 3 and in Formula (9). Details are not described herein.

Operation 604: The SIMD instruction generation apparatus obtains a quantity of destination addresses, a quantity of source addresses, lengths of H loop dimensions, and a linear coordinate coefficient of a tensor in the first tensor formula.

In this embodiment, after obtaining the first tensor formula, the SIMD instruction generation apparatus may obtain the following parameters through analysis based on the first tensor formula:

$$E_0=16, E_1=4, E_2=6, E_3=4, E_4=3, E_5=2 \quad (11)$$

$$\text{Tensor } C, a_0^0=1, a_1^0=48, a_2^0=304, a_3^0=4880, \\ a_4^0=19536, a_5^0=58656 \quad (12)$$

$$\text{Tensor } S_0, 138=1, b_0^0=48, b_1^0=912, b_2^0=5776, \\ b_4^0=17344, b_5^0=34736 \quad (13)$$

$$\text{Tensor } S_1, b_0^1=1, b_1^1=0, b_2^1=912, b_3^1=0, b_4^1=0, \\ b_5^1=5568 \quad (14)$$

$$\text{OP is addition (add)}, H=6 \quad (15)$$

The meaning of the letters can be understood with reference to the description in the embodiment corresponding to FIG. 3. Details are not described herein.

Operation 605: The SIMD instruction generation apparatus obtains a second SIMD instruction model matching the first tensor formula.

In this embodiment, the SIMD instruction generation apparatus determines whether $E_0$ meets a first constraint condition corresponding to first indication information (1) in Table 5, and if a determination result is that $E_0$ meets the first constraint condition, an SIMD instruction model corresponding to the first indication information (1) is determined as one SIMD instruction instruction model in the second SIMD instruction model. In this embodiment, the SIMD instruction generation apparatus determines whether $E_0$ and $E_1$ meet a first constraint condition corresponding to first indication information (2) in Table 5, and if a determination result is that $E_0$ and $E_1$ meet the first constraint condition, an SIMD instruction model corresponding to the first indication information (2) is determined as one SIMD instruction model in the second SIMD instruction model. The SIMD instruction generation apparatus determines whether $E_0$ and $E_1$ meet a first constraint condition corresponding to first indication information (3) in Table 5, and if a determination result is that $E_0$ and $E_1$ meet the first constraint condition, an SIMD instruction model corresponding to the first indication information (3) is determined as one SIMD instruction model in the second SIMD instruction model. The SIMD instruction generation apparatus determines whether $E_0$, $E_1$, and $E_2$ meet a first constraint condition corresponding to first indication information (4) in Table 5, and if a determination result is that $E_0$, $E_1$, and $E_2$ meet the first constraint condition, an SIMD instruction model corresponding to the first indication information (4) is determined as one SIMD instruction model in the second SIMD instruction model. The SIMD instruction generation apparatus performs the foregoing operations, to obtain four SIMD instruction models matching the first tensor formula.

Operation 606: The SIMD instruction generation apparatus generates a parameter value of the second SIMD instruction model.

In this embodiment, the SIMD instruction generation apparatus may be preconfigured with a parameter calculation rule. After obtaining the four SIMD instruction models included in the second SIMD instruction model, lengths of N loop dimensions in a to-be-processed calculation formula, and a linear coordinate coefficient in the first tensor formula, the SIMD instruction generation apparatus generates model parameters of the four SIMD instruction models included in the second SIMD instruction model. Table 6 shows parameter calculation rules of a first parameter and an address stride parameter. Meanings of the letters in Table 2 can be understood with reference to the description in the embodiment corresponding to FIG. 3. Details are not described herein.

TABLE 6

| Value of N | | First parameter | Address stride parameter |
|---|---|---|---|
| 3 | | $\text{repeat}_0 = E_0$ | $\text{stride}_0 = \sigma_0$ |
| | | $\text{repeat}_1 = E_1$ | $\text{stride}_1 = \sigma_1$ |
| | | $\text{repeat}_2 = E_2$ | $\text{stride}_2 = \sigma_2$ |
| 2 | Submodel 0 | $\text{repeat}_0 = E_0$ | $\text{stride}_0 = \sigma_0$ |
| | | $\text{repeat}_1 = \min(E_1, 8)$ | $\text{stride}_1 = \sigma_1$ |
| | | $\text{repeat}_2 = \min\left(\left\lfloor\frac{E_1}{8}\right\rfloor, 4\times 5\right)$ | $\text{stride}_2 = \text{repeat}_1 \times \text{stride}_1$ |
| | Submodel 1 | $\text{repeat}_0 = 16$ | $\text{stride}_0 = 0$ |
| | | $\text{repeat}_1 = \min\left(\left\lfloor\frac{E_0}{\text{repeat}_0}\right\rfloor, 8\times 5\right)$ | $\text{stride}_1 = \text{repeat}_0 \times \text{stride}_0$ |
| | | $\text{repeat}_2 = E_1$ | $\text{stride}_2 = \sigma_1$ |
| 1 | | $\text{repeat}_0 = 16$ | $\text{stride}_0 = 1$ |
| | | $\text{repeat}_1 = \min\left(\left\lfloor\frac{E_0}{\text{repeat}_0}\right\rfloor, 8\right)$ | $\text{stride}_1 = \text{repeat}_0 \times \text{stride}_0$ |
| | | $\text{repeat}_2 = \min\left(\left\lfloor\frac{E_0}{\text{repeat}_0 \times \text{repeat}_1}\right\rfloor, 4\times 5\right)$ | $\text{stride}_2 = \text{repeat}_1 \times \text{stride}_1$ |

The SIMD instruction generation apparatus substitutes the obtained lengths of the N loop dimensions and the linear coordinate coefficient in the first tensor formula to Table 6, to calculate the following parameter values of the first parameter and the address stride parameter. Refer to Table 7.

TABLE 7

| Parameter sequence | $repeat_1, repeat_2, dstStride_{0,1}, srcStride_{0,1}, srcStride_{1,1}, dstStride_{0,2}, srcStride_{0,2}, srcStride_{1,2}$ |
|---|---|
| Three-dimensional SIMD instruction model | 4, 6, 48, 48, 0, 304, 912, 912 |
| Two-dimensional SIMD instruction model  Submodel 0 | 4, 0, 48, 48, 0, 192, 192, 0 |
| Two-dimensional SIMD instruction model  Submodel 1 | 1, 4, 16, 16, 0, 48, 48, 0 |
| One-dimensional SIMD instruction model | 1, 0, 16, 16, 0, 48, 48, 0 |

In a process in which the SIMD instruction generation apparatus generates the parameter values of the first parameter and the address stride parameter, the SIMD instruction generation apparatus finds that there is a problem of inexact division between the $3^{rd}$ loop dimension in the tensor formula in the three-dimensional SIMD instruction model and the first parameter $repeat_2$ corresponding to the $2^{nd}$ loop dimension in the first tensor formula in the three-dimensional SIMD instruction model. In other words, $repeat_2 = E_2$ cannot be realized in the three-dimensional SIMD instruction model. Therefore, the problem of inexact division needs to be resolved by setting the tail in the body and tail technologies, and then a generated parameter value of a body part of the three-dimensional SIMD instruction model and a parameter values of a tail part of the SIMD instruction are as follows:

$$repeat_2^{body}=4, repeat_2^{tail}=2, F_2^b=1, F_2^t=1$$

$$B_2^{D0}=0, B_2^{S0}=0, T_2^{D0}=3648, T_2^{S0}=3648, T_2^{S1}=1216$$

Operation 607: The SIMD instruction generation apparatus substitutes the parameter value of the second SIMD instruction model into the second SIMD instruction model, to obtain four first SIMD instructions.

Operation 608: The SIMD instruction generation apparatus generates function values of cost functions of the four first SIMD instructions, and selects an SIMD instruction with a largest cost function value.

In this embodiment, the SIMD instruction generation apparatus may obtain a hardware performance parameter of the V chip. In other words, values of $c_t$, $c_v$, and $c_r^1$ may be automatically obtained by the SIMD instruction generation apparatus. After the SIMD instruction generation apparatus generates parameters of four SIMD instructions matching the first tensor formula in operation 606, the SIMD instruction generation apparatus substitutes the corresponding parameters into Formula (10), to obtain the function values of the cost functions of the four SIMD instructions included in the first SIMD instruction. For details, refer to Table 8.

TABLE 8

| Value of N | | Function value of a cost function |
|---|---|---|
| Three-dimensional SIMD instruction | | 0.9911007 |
| Two-dimensional | Submodel 0 | 0.989466 |
|  | Submodel 1 | 0.988957 |

TABLE 8-continued

| Value of N | Function value of a cost function |
|---|---|
| SIMD instruction  One-dimensional SIMD instruction | 0.941043 |

In this embodiment, after obtaining the function values of the cost functions of the four SIMD instructions matching the first tensor formula, the SIMD instruction generation apparatus selects an SIMD instruction with the largest cost function value from the four SIMD instructions, and determines the selected SIMD instruction as an optimal SIMD instruction matching the first tensor formula.

To have a more intuitive understanding of the beneficial effects brought by this embodiment of this application, the following further describes the beneficial effects brought by this embodiment of this application with reference to Table 9 and the embodiment corresponding to FIG. 6. A beneficial effect of Table 9 is preset when the SIMD instruction that is of the target type and that matches the first tensor formula in the embodiment corresponding to FIG. 6 is obtained. Refer to Table 9.

TABLE 9

| | This embodiment of this application | Brute-force search |
|---|---|---|
| Search Count | 4 | ≥589824(1 × 16 × 16 × 48 × 48) |

It can be learned, with reference to the embodiment corresponding to FIG. 6, that, in the method provided in this embodiment of this application, a total of four search operations are performed to obtain the first tensor formula. However, in a current brute-force search manner, all parameter value combinations need to be enumerated starting from 0. To identify a feasible SIMD instruction parameter combination, when a value of N is 1, 589824 search operations need to be performed. It is clearly that compared with the current brute-force search, in the SIMD instruction processing method provided in this embodiment of this application, efficiency of an SIMD instruction matching process is greatly improved.

Figure 7:
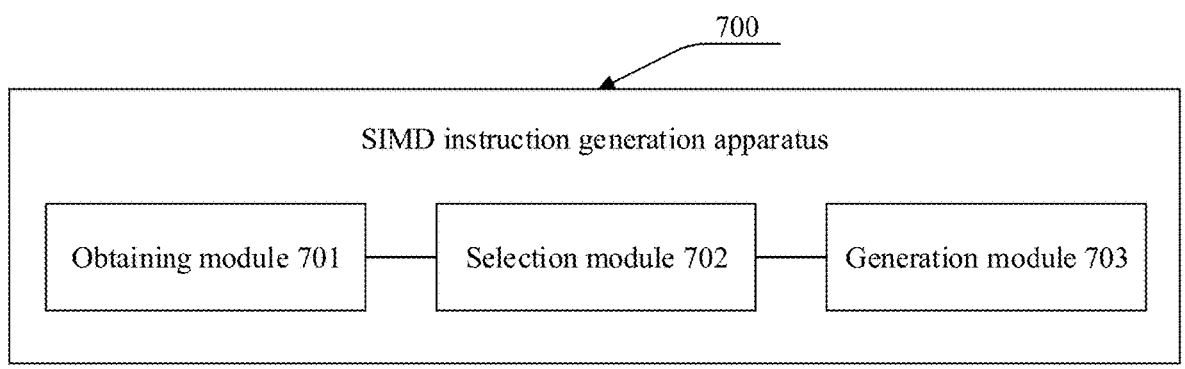
FIG. 7 is a schematic diagram of a structure of an SIMD instruction generation apparatus according to an embodiment of this application.

According to embodiments corresponding to FIG. 1 to FIG. 6, to better implement the foregoing solutions in embodiments of this application, the following further provides related devices configured to implement the foregoing solutions. For details, refer to FIG. 7. FIG. 7 is a schematic diagram of a structure of an SIMD instruction generation apparatus according to an embodiment of this application. The SIMD instruction generation apparatus 700 includes an obtaining module 701, a selection module 702, and a generation module 703. The obtaining module 701 is configured to obtain a length of each loop dimension of a first tensor formula. The obtaining module 701 is further configured to obtain a plurality of groups of information about a first single instruction multiple data SIMD instruction model. Each group of information about a first SIMD instruction model corresponds to at least one loop dimension of one tensor formula, each group of information about a first SIMD instruction model includes a first constraint condition, and the first constraint condition is used to indicate a constraint condition of a length of each of the at least one loop dimension. The selection module 702 is configured to select information about a second SIMD instruction model from the plurality of groups of information about a first SIMD instruction model based on the first constraint condition and the length of each loop dimension of the first tensor formula. The information about a second instruction model matches the first tensor formula, and the length of the loop dimension of the first tensor formula meets the first constraint condition in the information about a second SIMD instruction model. The generation module 703 is configured to generate, based on a length of at least one loop dimension of the first tensor formula and the second SIMD instruction model, a first SIMD instruction obtained after the first tensor formula is converted.

In this embodiment of this application, a specific implementation solution of converting the first tensor formula into an SIMD instruction is implemented. The plurality of groups of information about a first SIMD instruction model are generated in advance, and a matched second SIMD instruction model is first selected from several groups of information about a first SIMD instruction model based on the length of each loop dimension of the tensor formula in a conversion process, to greatly improve efficiency of an SIMD instruction generation process.

In a possible design, each group of information about a first SIMD instruction model further includes first indication information, one piece of first indication information is used to indicate a correspondence between K first parameters of one first SIMD instruction model and at least one loop dimension of one tensor formula, K is an integer greater than or equal to 1, and the first parameter indicates a quantity of times of repeatedly performing an operation on a data object in one tensor formula.

In a possible design, the at least one loop dimension includes N loop dimensions, at least one group of information about a first SIMD instruction model includes a plurality of types of information about an SIMD instruction model, different types of information about an SIMD instruction model correspond to different values of N, and N is an integer greater than or equal to 1.

In this embodiment of this application, category division is performed on the at least one group of information about a first SIMD instruction model based on a quantity of loop dimensions that corresponds to the information about a first SIMD instruction model, to help separately manage different types of information about a first SIMD instruction model subsequently, so as to improve management precision.

In a possible design, the first constraint condition is related to a chip type of the first SIMD instruction obtained after conversion.

In this embodiment of this application, a set of information about an SIMD instruction model is generated based on a specific chip, and different chips generate different information about an SIMD instruction model, so that not only an application scenario of this solution is extended, but also a degree at which an SIMD instruction model fits a chip is improved.

In a possible design, the generation module 703 is specifically configured to: generate a plurality of first SIMD instructions based on the length of the at least one loop dimension of the first tensor formula and the second SIMD instruction model; and select, based on a cost function of each of the plurality of first SIMD instructions, an SIMD instruction that satisfies an optimization objective in the plurality of first SIMD instructions, and use the selected SIMD instruction as the first SIMD instruction obtained after the first tensor formula is converted. The SIMD instruction that satisfies the optimization objective is an SIMD instruction whose cost function has a largest or smallest function value, and the cost function indicates an optimization objective related to the first SIMD instruction.

In this embodiment of this application, the cost function is generated in advance, to assist in selecting an optimal SIMD instruction when executing an SIMD instruction conversion stage of a tensor formula of a target operation type. The cost function is generated based on the optimization objective, and may meet an SIMD instruction optimization requirement of a user.

In a possible design, an optimization objective indicated by the cost function includes at least one of the following: a smallest quantity of execution times of an SIMD instruction, a largest quantity of execution times of an SIMD instruction, a smallest quantity of bodies and tails in an SIMD instruction, a largest quantity of bodies and tails in an SIMD instruction, a longest interval between a body and a tail in an SIMD instruction, a shortest interval between a body and a tail in an SIMD instruction, a shortest scheduling delay of an SIMD instruction, a longest scheduling delay of an SIMD instruction, shortest total execution duration of an SIMD instruction, a highest calculation overhead of an address stride in an SIMD instruction, and a lowest calculation overhead of the address stride in an SIMD instruction.

In this embodiment of this application, a plurality of cases of the optimization objective are provided, and an application scenario of this solution is extended.

In a possible design, an independent variable of the cost function includes at least one of the following: a parameter value of the first parameter in the first SIMD instruction, a quantity of bodies in the first SIMD instruction, a quantity of tails in the first SIMD instruction, a quantity of times of calculating an address stride in the first SIMD instruction, duration of executing one SIMD instruction, and duration of switching from a process of executing one first SIMD instruction to a process of executing another first SIMD instruction.

In this embodiment of this application, the SIMD instruction cost function considers both an SIMD instruction parameter and a hardware parameter of a chip, so that a generated optimal SIMD instruction can more fully use performance of the chip.

In a possible design, the generation module 703 is specifically configured to: obtain, based on the first indication information in the information about a second SIMD instruction model, a first parameter corresponding to a first loop dimension in the first tensor formula, where the first loop dimension is one of at least one loop dimension, and a length of the first loop dimension is not exactly divided by a value range of the corresponding first parameter; and generate a parameter value of a body part of the first SIMD instruction and a parameter value of a tail part of the first SIMD instruction based on the length of the first loop dimension.

In this embodiment of this application, a problem that the length of the first loop dimension is not exactly divided by the value range of the corresponding first parameter can be resolved by using a body and tail technology, to extend an application scenario of this solution, and extend an applicable scope of this solution.

In a possible design, the generation module 703 is specifically configured to: obtain, based on the first indication information in the information about a second SIMD instruction model, a first parameter corresponding to a second loop dimension in the first tensor formula, where the second loop dimension is a highest loop dimension in at least one loop dimension, and a length of the second loop dimension exceeds an upper limit of a value of the corresponding first parameter; and generate a parameter value of a body part of the first SIMD instruction based on the length of the second loop dimension.

In this embodiment of this application, a value range of a length of a loop dimension in a constraint condition may be extended by using the body and tail technology, to extend an applicable scope of this solution.

In a possible design, the at least one group of information about a first SIMD instruction model includes information about a third SIMD instruction model, information about a fourth SIMD instruction model, and information about a fifth SIMD instruction model, a value of N corresponding to the information about a third SIMD instruction model is less than a value of N corresponding to the information about a fourth SIMD instruction model, the value of N corresponding to the information about a fourth SIMD instruction model is less than a value of N corresponding to the information about a fifth SIMD instruction model, and N corresponding to the information about a fourth SIMD instruction model is greater than or equal to 2. The selection module 702 is specifically configured to: select the information about a second SIMD instruction model from the information about a third SIMD instruction model; and if the information about a second SIMD instruction model does not exist in the information about a fourth SIMD instruction model, terminate selecting the information about a second SIMD instruction model from the information about a fifth SIMD instruction model.

In this embodiment of this application, if a matched model does not exist in a low dimensional model, matching does not need to be performed on a high dimensional model, to effectively reduce a quantity of matching times, and further improve SIMD instruction generation efficiency.

In a possible design, the obtaining module 701 is further configured to obtain a second constraint condition. The second constraint condition is used to indicate a quantity of destination addresses in the first SIMD instruction model and a quantity of source addresses in the first SIMD instruction model.

The obtaining module 701 is further configured to obtain a quantity of destination addresses in the first tensor formula and a quantity of source addresses in the first tensor formula.

The selection module 702 is specifically configured to select at least one group of information about a second SIMD instruction model from the at least one group of information about a first SIMD instruction model when the quantity of destination addresses in the first tensor formula is the same as the quantity of destination addresses in the first SIMD instruction model, and the quantity of source addresses in the first tensor formula is the same as the quantity of source addresses in the first SIMD instruction model.

In this embodiment of this application, in a process of performing an automatic SIMD instruction conversion operation, whether the quantity of destination addresses and the quantity of source addresses in the first tensor formula meet a requirement for a quantity of destination addresses and a quantity of source addresses in an SIMD instruction model is first determined. Only when a constraint is satisfied, a subsequent SIMD instruction model matching operation is performed, to improve efficiency of an automatic SIMD instruction conversion process. In addition, if the requirement is not met, the alarm information is output in a timely manner, to remind a technical person to intervene in a timely manner.

In a possible design, the obtaining module 701 is specifically configured to obtain the at least one group of information about a first SIMD instruction model from a set of information about an SIMD instruction model. The set of information about an SIMD instruction model includes at least one subset of information about an SIMD instruction model, each subset of information about an SIMD instruction model corresponds to a tensor formula of one operation type, and a subset that is of information about an SIMD instruction model and to which the at least one group of information about a first SIMD instruction model belongs corresponds to an operation type of the first tensor formula.

In this embodiment of this application, the information about a first SIMD instruction model is generated for a tensor formula of a specific operation type. In other words, tensor formulas of different operation types correspond to different information about an SIMD instruction model. Therefore, there is a higher degree at which the information about a first SIMD instruction model fits a tensor formula of the operation type of the first tensor formula, and efficiency of an SIMD instruction generation process is improved.

It should be noted that content such as information exchange and an execution process between modules/units in the SIMD instruction generation apparatus 700 is based on a same idea as the method embodiments corresponding to FIG. 5A, FIG. 5B, and FIG. 6 in this application. For specific content, refer to descriptions in the method embodiments shown in this application. Details are not described herein again.

Figure 8:
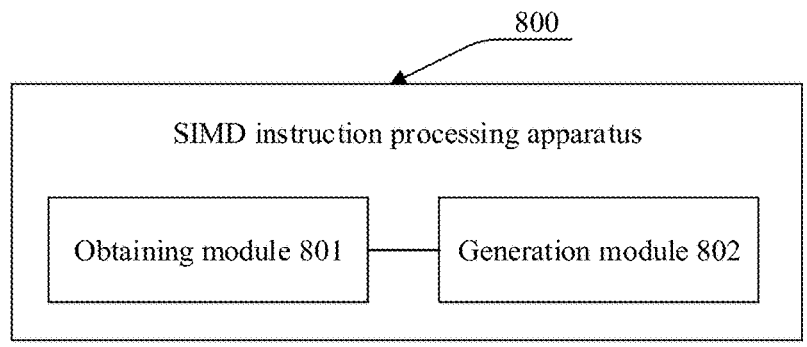
FIG. 8 is a schematic diagram of a structure of an SIMD instruction processing apparatus according to an embodiment of this application.

An embodiment of this application further provides an SIMD instruction processing apparatus. For details, refer to FIG. 8. FIG. 8 is a schematic diagram of a structure of an SIMD instruction processing apparatus according to an embodiment of this application. An SIMD instruction processing apparatus 800 includes an obtaining module 801 and a generation module 802. The obtaining module 801 is configured to obtain a first parameter value and a second parameter value that correspond to a first SIMD instruction model. The first parameter value is K and is used to indicate that the first SIMD instruction model includes K first parameters, K is an integer greater than or equal to 1, the second parameter value indicates a value constraint of the K first parameters, and the first parameter reflects a quantity of times of repeatedly performing an operation on a data object in a tensor formula matching the first SIMD instruction model. The generation module 802 is configured to generate information about a first SIMD instruction model based on the first parameter value and the second parameter value. One piece of information about a first SIMD instruction model corresponds to one first SIMD instruction model, the information about a first SIMD instruction model includes first indication information and a first constraint condition, the first indication information is used to indicate a correspondence between the K first parameters and at least one loop dimension of the tensor formula matching the first SIMD instruction model, and the first constraint condition is used to indicate a constraint condition of a length of each of the at least one loop dimension.

In a possible design, the obtaining module 801 is further configured to obtain a third parameter value. The third parameter value indicates a constraint on a quantity of bodies in the first SIMD instruction model. The generation module 802 is specifically configured to: generate the first indication information based on the first parameter value; and generate the first constraint condition based on the first indication information, the second parameter value, and the third parameter value.

In a possible design, the obtaining module 801 is further configured to obtain a fourth parameter value. The fourth parameter value is used to indicate a quantity of destination addresses in the first SIMD instruction model and a quantity of source addresses in the first SIMD instruction model. The generation module 802 is further configured to generate a second constraint condition based on the fourth parameter value. The second constraint condition is used to indicate a quantity of destination addresses and a quantity of source addresses in the tensor formula matching the first SIMD instruction model.

In a possible design, the obtaining module 801 is further configured to obtain a cost function corresponding to the first SIMD instruction model. The cost function is used to select an SIMD instruction that satisfies an optimization objective, the SIMD instruction that satisfies the optimization objective is an SIMD instruction whose cost function has a largest or smallest function value, and an independent variable of the cost function includes at least one of the following: a parameter value of the first parameter in the first SIMD instruction, a quantity of bodies in the first SIMD instruction, a quantity of tails in the first SIMD instruction, a quantity of times of calculating an address stride in the first SIMD instruction, duration of executing one SIMD instruction, and duration of switching from a process of executing one first SIMD instruction to a process of executing another first SIMD instruction.

It should be noted that content such as information exchange and an execution process between modules/units in the SIMD instruction processing apparatus 800 is based on a same idea as the method embodiments corresponding to FIG. 3, FIG. 4, and FIG. 6 in this application. For a specific implementation and a brought beneficial effect, refer to descriptions in the foregoing method embodiments shown in this application. Details are not described herein again.

Figure 9:
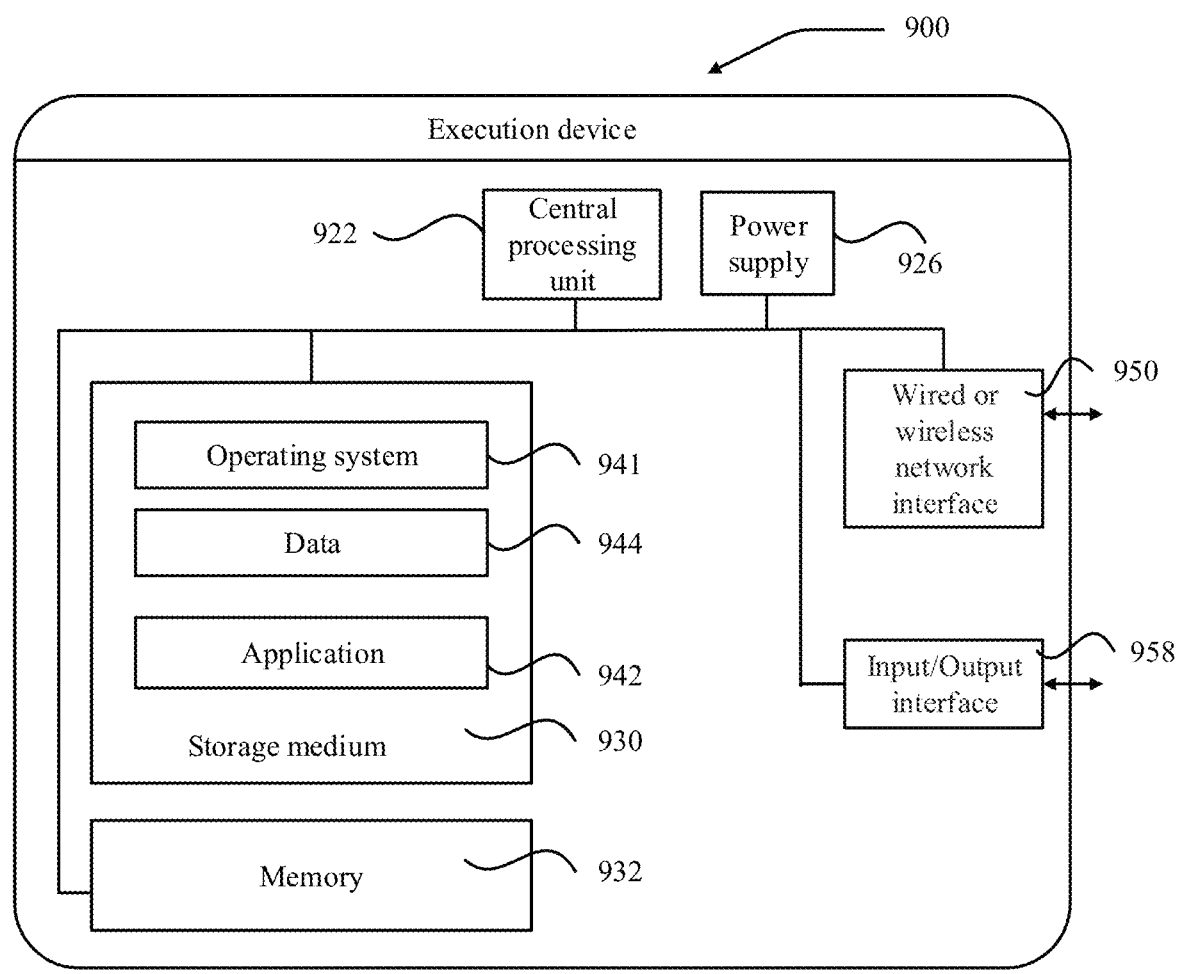
FIG. 9 is a schematic diagram of a structure of an execution device according to an embodiment of this application.

The following describes an execution device provided in an embodiment of this application. FIG. 9 is a schematic diagram of a structure of an execution device according to an embodiment of this application. An execution device 900 may be specifically represented as a desktop computer, a mobile phone, a tablet, a notebook computer, an intelligent wearable device, a radar data processing device, or the like. This is not limited herein. The SIMD instruction processing apparatus described in embodiments corresponding to FIG. 3 and FIG. 4 may be deployed on the execution device 900, to implement a function of the SIMD instruction processing apparatus 800 in the embodiment corresponding to FIG. 8. Alternatively, the SIMD instruction generation apparatus described in the embodiment corresponding to FIG. 5A and FIG. 5B may be deployed on the execution device 900, to implement a function of the SIMD instruction generation apparatus 700 in the embodiment corresponding to FIG. 7. Specifically, the execution device 900 may have a large difference due to a different configuration or different performance, and may include one or more central processing units (CPU) 922 (for example, one or more processors) and a memory 932. One or more storage media 930 (for example, one or more mass storage devices) storing application programs 942 or data 944. The memory 932 and the storage medium 930 may be used for temporary storage or permanent storage. A program stored in the storage medium 930 may include one or more modules (not shown in the figure), and each module may include a series of instruction operations performed on the execution device. Further, the central processing unit 922 may be configured to communicate with the storage medium 930, to perform, on the execution device 900, the series of instruction operations in the storage medium 930.

The execution device 900 may further include one or more power supplies 926, one or more wired or wireless network interfaces 950, one or more input/output interfaces 958, and/or one or more operating systems 941 such as Windows Server™, Mac OS X™, Unix™, Linux™, and FreeBSD™.

In this embodiment of this application, in a case, the central processing unit 922 is configured to implement a function of the SIMD instruction generation apparatus 700 in the embodiment corresponding to FIG. 7. Specifically, the central processing unit 922 is configured to: obtain a length of each loop dimension of a first tensor formula; obtain a plurality of groups of information about a first single instruction multiple data SIMD instruction model, where each group of information about a first SIMD instruction model corresponds to at least one loop dimension of one tensor formula, each group of information about a first SIMD instruction model includes a first constraint condition, and the first constraint condition is used to indicate a constraint condition of a length of each of the at least one loop dimension; select information about a second SIMD instruction model from the plurality of groups of information about a first SIMD instruction model based on the first constraint condition and the length of each loop dimension of the first tensor formula, where the information about a second instruction model matches the first tensor formula, and the length of the loop dimension of the first tensor formula meets the first constraint condition in the information about a second SIMD instruction model; and generate, based on a length of at least one loop dimension of the first tensor formula and the second SIMD instruction model, a first SIMD instruction obtained after the first tensor formula is converted.

It should be noted that, the central processing unit 922 may be further configured to perform another operation performed by the SIMD instruction generation apparatus 700 in the embodiment corresponding to FIG. 7, and a specific manner in which the central processing unit 922 performs the foregoing operations is based on a same concept as the method embodiments corresponding to FIG. 5A and FIG. 5B in this application. Technical effects brought by the central processing unit 922 are the same as those in the method embodiment corresponding to FIG. 5A and FIG. 5B in this application. For specific content, refer to descriptions in the method embodiment shown in this application. Details are not described herein again.

In this embodiment of this application, in a case, the central processing unit 922 is configured to implement a function of the SIMD instruction generation apparatus 700 in the embodiment corresponding to FIG. 7. Specifically, the central processing unit 922 is configured to: obtain a first parameter value and a second parameter value that correspond to a first SIMD instruction model, where the first parameter value is K and is used to indicate that the first SIMD instruction model includes K first parameters, K is an integer greater than or equal to 1, the second parameter value indicates a value constraint of the K first parameters, and the first parameter reflects a quantity of times of repeatedly performing an operation on a data object in a tensor formula matching the first SIMD instruction model; and generate information about a first SIMD instruction model based on the first parameter value and the second parameter value, where one piece of information about a first SIMD instruction model corresponds to one first SIMD instruction model, the information about a first SIMD instruction model includes first indication information and a first constraint condition, the first indication information is used to indicate a correspondence between the K first parameters and at least one loop dimension of the tensor formula matching the first SIMD instruction model, and the first constraint condition is used to indicate a constraint condition of a length of each of the at least one loop dimension.

It should be noted that, the central processing unit 922 may be further configured to perform another operation performed by the SIMD instruction processing apparatus 800 in the embodiment corresponding to FIG. 8, and a specific manner in which the central processing unit 922 performs the foregoing operations is based on a same concept as the method embodiments corresponding to FIG. 3 and FIG. 4 in this application. Technical effects brought by the central processing unit 922 are the same as those in the method embodiment corresponding to FIG. 3 and FIG. 4 in this application. For specific content, refer to descriptions in the method embodiment shown in this application. Details are not described herein again.

An embodiment of this application further provides a computer program product. When the computer program product runs on a computer, the computer is enabled to perform operations performed by an execution device in the method described in embodiments shown in FIG. 3 and FIG. 4; or the computer is enabled to perform operations performed by an execution device in the method described in the embodiment shown in FIG. 5A and FIG. 5B.

An embodiment of this application further provides a computer-readable storage medium. The computer-readable storage medium stores a program used to perform signal processing. When the program runs on a computer, the computer is enabled to perform operations performed by an execution device in the method described in embodiments shown in FIG. 3 and FIG. 4, or the computer is enabled to perform operations performed by the execution device in the method described in the embodiment shown in FIG. 5A and FIG. 5B.

An execution device, a training device, a terminal device, or a communications device provided in this embodiment of this application may be specifically a chip. The chip includes a processing unit and a communications unit. The processing unit may be, for example, a processor. The communications unit may be, for example, an input/output interface, a pin, or a circuit. The processing unit may execute a computer execution instruction stored in a storage unit, so that a chip in the execution device performs the SIMD instruction processing method described in embodiments shown in FIG. 3 and FIG. 4, or a chip in the execution device performs the SIMD instruction generation method described in the embodiment shown in FIG. 5A and FIG. 5B. Optionally, the storage unit is a storage unit in the chip, for example, a register or a cache; or the storage unit may be a storage unit that is in the radio access device and that is located outside the chip, for example, a read-only memory (ROM), another type of static storage device that can store static information and instructions, or a random access memory (RAM).

The processor mentioned above may be a general-purpose central processing unit, a microprocessor, an ASIC, or one or more integrated circuits for controlling program execution of the method according to the first aspect.

In addition, it should be noted that the described apparatus embodiment is merely an example. The units described as separate parts may or may not be physically separate, and parts displayed as units may or may not be physical units, that is, may be located in one place, or may be distributed on a plurality of network units. Some or all of the modules may be selected according to an actual need to achieve the objectives of the solutions of embodiments. In addition, in the accompanying drawings of the apparatus embodiments provided in this application, connection relationships between modules indicate that the modules have communication connections with each other, which may be specifically implemented as one or more communications buses or signal cables.

Based on the description of the foregoing implementations, a person skilled in the art may clearly understand that this application may be implemented by using software in combination with necessary universal hardware, or certainly, may be implemented by using dedicated hardware, including a dedicated integrated circuit, a dedicated CPU, a dedicated memory, a dedicated component, or the like. Generally, any function that can be completed by using a computer program can be very easily implemented by using corresponding hardware. Moreover, a specific hardware structure used to implement a same function may be in various forms, for example, in a form of an analog circuit, a digital circuit, a dedicated circuit, or the like. However, as for this application, software program implementation is a better implementation in most cases. Based on such an understanding, the technical solutions of this application essentially or the part contributing to a conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or a part of the foregoing embodiments may be implemented by using software, hardware, firmware, or any combination thereof. When the software is used to implement embodiments, all or a part of embodiments may be implemented in a form of a computer program product.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, an execution device, or a data center to another website, computer, execution device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as an execution device or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A single instruction multiple data (SIMD) instruction generation method, comprising:
   obtaining a length of each of at least one loop dimension of a first tensor formula;

obtaining a plurality of groups of information about a first single instruction multiple data (SIMD) instruction model, wherein each group of information about the first SIMD instruction model corresponds to at least one loop dimension of one tensor formula, each group of information about the first SIMD instruction model comprises a first constraint condition, and the first constraint condition is used to indicate a constraint condition of a length of each of the at least one loop dimension;

selecting information about a second SIMD instruction model from the plurality of groups of information about the first SIMD instruction model based on the first constraint condition and the length of each of the at least one loop dimension of the first tensor formula, wherein the length of each of the at least one loop dimension of the first tensor formula meets the first constraint condition in the information about the second SIMD instruction model; and generating, based on the length of each of the at least one loop dimension of the first tensor formula and the second SIMD instruction model, a first SIMD instruction obtained after the first tensor formula is converted.

2. The method according to claim 1, wherein each group of information about the first SIMD instruction model further comprises first indication information, one piece of first indication information is used to indicate a correspondence between K first parameters of the first SIMD instruction model and at least one loop dimension of one tensor formula, K is an integer greater than or equal to 1, and a first parameter indicates a quantity of times of repeatedly performing an operation on a data object in one tensor formula.

3. The method according to claim 2, wherein there are N loop dimensions, at least one group of information about the first SIMD instruction model comprises a plurality of types of information about an SIMD instruction model, different types of information about an SIMD instruction model correspond to different values of N, and N is an integer greater than 1.

4. The method according to claim 2, wherein the first constraint condition is related to a chip type of the first SIMD instruction obtained after conversion.

5. The method according to claim 1, wherein the generating, based on the length of each of the at least one loop dimension of the first tensor formula and the second SIMD instruction model, a first SIMD instruction obtained after the first tensor formula is converted comprises:

generating a plurality of first SIMD instructions based on the length of the at least one loop dimension of the first tensor formula and the second SIMD instruction model; and selecting, based on a cost function of each of the plurality of first SIMD instructions, an SIMD instruction that satisfies an optimization objective in the plurality of first SIMD instructions, and using the selected SIMD instruction as the first SIMD instruction obtained after the first tensor formula is converted, wherein the cost function indicates an optimization objective related to the first SIMD instruction.

6. The method according to claim 5, wherein the optimization objective indicated by the cost function comprises at least one of the following: a smallest quantity of execution times of an SIMD instruction, a largest quantity of execution times of an SIMD instruction, a smallest quantity of bodies and tails in an SIMD instruction, a largest quantity of bodies and tails in an SIMD instruction, a longest interval between a body and a tail in an SIMD instruction, a shortest interval between a body and a tail in an SIMD instruction, a shortest scheduling delay of an SIMD instruction, a longest scheduling delay of an SIMD instruction, shortest total execution duration of an SIMD instruction, a highest calculation overhead of an address stride in an SIMD instruction, and a lowest calculation overhead of the address stride in an SIMD instruction.

7. The method according to claim 5, wherein an independent variable of the cost function comprises at least one of the following: a parameter value of the first parameter in the first SIMD instruction, a quantity of bodies in the first SIMD instruction, a quantity of tails in the first SIMD instruction, a quantity of times of calculating an address stride in the first SIMD instruction, duration of executing one SIMD instruction, and duration of switching from a process of executing one first SIMD instruction to a process of executing another first SIMD instruction.

8. The method according to claim 2, wherein the generating, based on the length of each of the at least one loop dimension of the first tensor formula and the second SIMD instruction model, a first SIMD instruction obtained after the first tensor formula is converted comprises:

obtaining, based on the first indication information in the information about a second SIMD instruction model, a first parameter corresponding to a first loop dimension of the first tensor formula, wherein the first loop dimension is one of the at least one loop dimension, and a length of the first loop dimension is not exactly divided by a value range of the corresponding first parameter; and generating a parameter value of a body part of the first SIMD instruction and a parameter value of a tail part of the first SIMD instruction based on the length of the first loop dimension.

9. The method according to claim 2, wherein the generating, based on the length of each of the at least one loop dimension of the first tensor formula and the second SIMD instruction model, a first SIMD instruction obtained after the first tensor formula is converted comprises:

obtaining, based on the first indication information in the information about a second SIMD instruction model, a first parameter corresponding to a second loop dimension of the first tensor formula, wherein the second loop dimension is a highest loop dimension in the at least one loop dimension, and a length of the second loop dimension exceeds an upper limit of a value of the corresponding first parameter; and generating a parameter value of a body part of the first SIMD instruction based on the length of the second loop dimension.

10. A single instruction multiple data (SIMD) instruction generation device, wherein the SIMD instruction generation device supports a multipath technology, comprising:

a memory and a processor, wherein the memory is coupled to the processor; and the memory stores program instructions, and when the program instructions are executed by the processor, the processor is enabled to perform operations:

obtaining a length of each of at least one loop dimension of a first tensor formula;

obtaining a plurality of groups of information about a first single instruction multiple data (SIMD) instruction model, wherein each group of information about the first SIMD instruction model corresponds to at least one loop dimension of one tensor formula, each group of information about the first SIMD instruction model comprises a first constraint condition, and the first constraint condition is used to indicate a constraint condition of a length of each of the at least one loop dimension;

selecting information about a second SIMD instruction model from the plurality of groups of information about the first SIMD instruction model based on the first constraint condition and the length of each of the at least one loop dimension of the first tensor formula, wherein the length of each of the at least one loop dimension of the first tensor formula meets the first constraint condition in the information about a second SIMD instruction model; and generating, based on the length of each of the at least one loop dimension of the first tensor formula and the second SIMD instruction model, a first SIMD instruction obtained after the first tensor formula is converted.

11. The device according to claim 10, wherein each group of information about the first SIMD instruction model further comprises first indication information, one piece of first indication information is used to indicate a correspondence between K first parameters of the first SIMD instruction model and at least one loop dimension of one tensor formula, K is an integer greater than or equal to 1, and a first parameter indicates a quantity of times of repeatedly performing an operation on a data object in one tensor formula.

12. The device according to claim 11, wherein there are N loop dimensions, at least one group of information about the first SIMD instruction model comprises a plurality of types of information about an SIMD instruction model, different types of information about an SIMD instruction model correspond to different values of N, and N is an integer greater than 1.

13. The device according to claim 11, wherein the first constraint condition is related to a chip type of the first SIMD instruction obtained after conversion.

14. A non-transitory computer-readable storage medium, storing one or more instructions that, when executed by at least one processor, cause the at least one processor to:

obtain a length of each of at least one loop dimension of a first tensor formula;

obtain a plurality of groups of information about a first single instruction multiple data (SIMD) instruction model, wherein each group of information about the first SIMD instruction model corresponds to at least one loop dimension of one tensor formula, each group of information about the first SIMD instruction model comprises a first constraint condition, and the first constraint condition is used to indicate a constraint condition of a length of each of the at least one loop dimension;

select information about a second SIMD instruction model from the plurality of groups of information about the first SIMD instruction model based on the first constraint condition and the length of each of the at least one loop dimension of the first tensor formula, wherein the length of each of the at least one loop dimension of the first tensor formula meets the first constraint condition in the information about a second SIMD instruction model; and generate, based on the length of each of the at least one loop dimension of the first tensor formula and the second SIMD instruction model, a first SIMD instruction obtained after the first tensor formula is converted.

15. The computer-readable storage medium according to claim 14, wherein each group of information about the first SIMD instruction model further comprises first indication information, one piece of first indication information is used to indicate a correspondence between K first parameters of the first SIMD instruction model and at least one loop dimension of one tensor formula, K is an integer greater than or equal to 1, and a first parameter indicates a quantity of times of repeatedly performing an operation on a data object in one tensor formula.

16. The computer-readable storage medium according to claim 15, wherein there are N loop dimensions, at least one group of information about the first SIMD instruction model comprises a plurality of types of information about an SIMD instruction model, different types of information about an SIMD instruction model correspond to different values of N, and N is an integer greater than 1.

* * * * *